United States Patent
Niizato

(10) Patent No.: US 8,350,958 B2
(45) Date of Patent: Jan. 8, 2013

(54) IMAGING APPARATUS THAT SEQUENTIALLY EXECUTES START-UP PROCESSING BASED ON DETECTED MOVEMENT

(75) Inventor: Manabu Niizato, Tokyo (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/730,329

(22) Filed: Mar. 24, 2010

(65) Prior Publication Data

US 2010/0271508 A1  Oct. 28, 2010

(30) Foreign Application Priority Data

Apr. 22, 2009 (JP) ................ P2009-104357

(51) Int. Cl.
*H04N 5/225* (2006.01)
*G03B 7/26* (2006.01)
(52) U.S. Cl. ...................... 348/372; 396/301
(58) Field of Classification Search .............. 348/372; 396/301–302
See application file for complete search history.

(56) References Cited

U.S. PATENT DOCUMENTS

| 7,411,631 B1 * | 8/2008 | Joshi et al. ............ 348/734 |
| 7,532,246 B1 * | 5/2009 | Wilhelm ............... 348/372 |
| 2006/0237626 A1 * | 10/2006 | Sakai et al. ........... 250/208.1 |
| 2007/0136774 A1 * | 6/2007 | Lourie et al. .......... 725/105 |
| 2010/0007801 A1 * | 1/2010 | Cooper et al. ......... 348/730 |

FOREIGN PATENT DOCUMENTS

JP    2007-282265    10/2007

OTHER PUBLICATIONS

U.S. Appl. No. 12/750,975, filed Mar. 31, 2010, Niizato.

* cited by examiner

*Primary Examiner* — Kelly L Jerabek
(74) *Attorney, Agent, or Firm* — Oblon, Spivak, McClelland, Maier & Neustadt, L.L.P.

(57) ABSTRACT

An imaging apparatus includes: plurality of control units configured to control an imaging function; a requesting unit configured to request execution of start-up processing of a plurality of the control units; a detecting unit configured to detect movement to be applied to a device main unit; and a start-up control unit configured to cause, upon the detecting unit detecting particular movement in a power-off state wherein the movement of the device main unit externally appears to be stopped, each of a plurality of the control units to start the start-up processing still in the power-off state, and upon execution of the start-up processing being requested from the requesting unit, cause a plurality of the control units to start reception of an imaging command according to the states of the start-up processing of a plurality of the control units.

6 Claims, 12 Drawing Sheets

IMAGING APPARATUS THAT SEQUENTIALLY EXECUTES START-UP PROCESSING BASED ON DETECTED MOVEMENT

BACKGROUND OF THE INVENTION

1. Field of the Invention

The present invention relates to an imaging apparatus, an imaging control method, and an imaging control program, which is suitably applied to, for example, digital still cameras.

2. Description of the Related Art

With digital cameras according to the related art, upon a power on command being input, a part of a boot program is read out from ROM (Read Only Memory) and loaded to RAM (Random Access Memory). The digital camera thus executes start-up processing of the imaging system, and upon the imaging system start-up processing ending, the digital camera is capable of imaging subjects.

Once the imaging system start-up processing has ended, each time a release key is pressed, imaging processing executed to image a subject, and image data obtained as a result thereof is temporarily stored in buffer memory.

Thus, with the digital camera, upon imaging processing of one time or multiple times ending, the remainder of the boot program is read out from the ROM and loaded to the RAM. Thus, the digital camera sequentially executes medium information obtaining processing to obtain, from a memory card detachably mounted to the digital camera, medium information relating to format information, remaining battery amount, and so forth, and monitor start-up processing.

Upon the medium information obtaining processing and monitor start-up processing ending, data storage processing is executed. Thus, the digital camera sequentially reads out the image data which had been temporarily stored in the buffer memory therefrom, and transfers this to the memory card for storage. In this way, digital cameras have been arranged to enable subjects to be imaged in the shortest possible time from input of the power on command (e.g., see Japanese Unexamined Patent Application Publication No. 2007-282265 (pp. 5-6, FIGS. 2 and 4)).

SUMMARY OF THE INVENTION

However, with the digital camera thus configured, a single control unit sequentially executes imaging system start-up processing, imaging processing, medium information obtaining processing, monitor start-up processing, and data storage processing as serial processing.

Accordingly, the digital camera temporarily makes a subject an imaginable state from the ending point of the imaging system start-up processing to execute the imaging processing, but the imaging processing is not readily executed between the starting point of the subsequent medium information obtaining processing and the ending point of the data storage processing.

That is to say, the digital camera has to forcibly interrupt imaging of a subject between the starting point of the medium information obtaining processing and the ending point of the data storage processing.

Accordingly, the digital camera has a problem wherein it relatively takes time from input of a power on command to transition to a state in which a subject can be imaged continuously, and ease-of-use is poor.

It has been found desirable to propose an imaging apparatus, an imaging control method, and an imaging control program, whereby ease-of-use can be improved.

According to an embodiment of the present invention, an imaging apparatus includes: multiple control units configured to control an imaging function; a requesting unit configured to request execution of start-up processing of the multiple control units; a detecting unit configured to detect movement to be applied to a device main unit; and a start-up control unit configured to cause, upon the detecting unit detecting particular movement in a power-off state wherein the operation of the device main unit externally appears to be stopped, each of the multiple control units to start the start-up processing still in the power-off state, and upon execution of the start-up processing being requested from the requesting unit, cause the multiple control units to start reception of an imaging command according to the states of the start-up processing of the multiple control units.

Accordingly, with the above configuration, the imaging apparatus causes the multiple control units configured to control an imaging function to start the start-up processing according to detection of particular movement of the device main unit before execution of the start-up processing is requested, whereby time since execution of the start-up processing was requested until transition to a state in which imaging can be executed continuously can extremely be shortened.

According to an embodiment of the present invention, an imaging apparatus includes: multiple control units configured to control an imaging function; a requesting unit configured to request execution of start-up processing of the multiple control units; a detecting unit configured to detect movement to be applied to a device main unit; and a start-up control unit configured to cause, upon the detecting unit detecting particular movement in a power-off state wherein the operation of the device main unit externally appears to be stopped, each of the multiple control units to start the start-up processing still in the power-off state, and upon execution of the start-up processing being requested from the requesting unit, cause the multiple control units to start reception of an imaging command according to the states of the start-up processing of the multiple control units, and accordingly, the imaging apparatus causes the multiple control units configured to control an imaging function to start the start-up processing according to detection of particular movement of the device main unit before execution of the start-up processing is requested, whereby time since execution of the start-up processing was requested until transition to a state in which imaging can be executed continuously can extremely be shortened, and consequently, an imaging apparatus whereby ease of use can be improved, and an imaging control method and an imaging control program whereby ease of use of the imaging apparatus can be improved can be realized.

DESCRIPTION OF THE PREFERRED EMBODIMENTS

Best modes for carrying out the present invention (hereinafter referred to as "embodiments") will be described with reference to the drawings. Note that description will proceed as follows:
1. Embodiment, and
2. Modifications.

1. Embodiment

1-1. Circuit Configuration of Digital Still Camera

Figure 1:
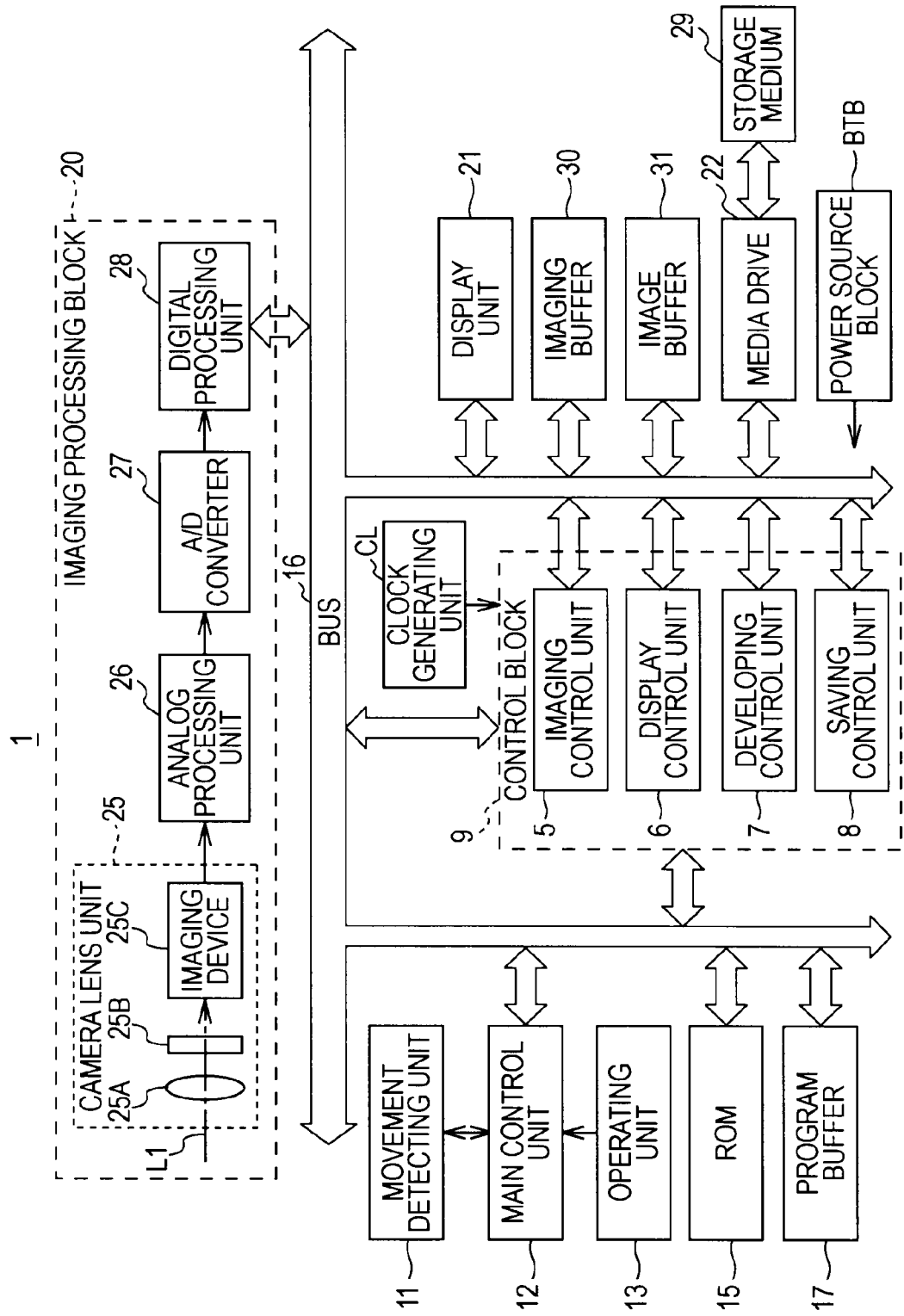
FIG. 1 is a block diagram illustrating the circuit configuration of a digital still camera according to an embodiment of the present invention.

In FIG. 1, reference numeral 1 denotes the entirety of a digital still camera according to an embodiment of the present invention. The digital still camera 1 includes a control block 9 further including four control units, which are an imaging control unit 5, display control unit 6, developing control unit 7, and saving control unit 8, each made up of a CPU (Central Processing Unit).

A main control unit 12 configured of a CPU is also provided to the digital still camera 1, which is for controlling the imaging control unit 5, display control unit 6, developing control unit 7, saving control unit 8, and movement detecting unit 11.

In this case, the main control unit 12 holds a main control program beforehand. The main control unit 12 controls the movement detecting unit 11 in accordance with a main control program. Also, the main control unit 12 controls, in accordance with the main control program, the imaging control unit 5, display control unit 6, developing control unit 7, and saving control unit 8 according to various types of command to be input from an operating unit 13 including various operation keys by a user's operation. Further, the main control unit 12 executes processing corresponding to various types of command to be input from the operating unit 13 in accordance with the main control program.

Here, the movement detecting unit 11 includes an acceleration sensor and an angular velocity sensor. The movement detecting unit 11 is for detecting movement applied to the digital still camera 1 by the acceleration sensor and the angular velocity sensor as acceleration and angular velocity.

On the other hand, the operating unit 13 includes a power key as various types of operation key whereby a power on command for requesting the digital still camera 1 of execution of device start-up processing to boot the whole digital still camera 1, and a power off command for requesting the digital still camera 1 of stopping operation can be input in a toggle manner. Also, the operating unit 13 includes a release key for inputting an imaging command for photography shooting, and so forth, as various types of operation keys.

Note that the device start-up processing to boot the whole digital still camera 1 is processing for allowing this digital still camera 1 to realize an imaging function for photography shooting of a subject (i.e., from imaging of a subject to saving of a photography shot image).

Further, ROM (Read Only Memory) 15 is also provided to the digital still camera 1. The ROM 15 stores beforehand an initial program such as an IPL (Initial Program Loading). Also, the ROM 15 stores beforehand four types of boot programs such as OS (Operating System) or the like for enabling each of the imaging control unit 5, display control unit 6, developing control unit 7, and saving control unit 8 to execute various types of processing. Further, the ROM 15 stores beforehand various types of programs such as various types of application programs and the like for enabling each of the imaging control unit 5, display control unit 6, developing control unit 7, and saving control unit 8 to execute various types of processing.

Further, with the digital still camera 1, there are also provided a power source block BTB including a battery, and a clock generating unit CL capable of generating various types of operation clocks to supply these to each circuit block such as the main control unit 12, imaging control unit 5, display control unit 6, developing control unit 7, saving control unit 8, or the like.

Thus, each circuit block such as the main control unit 12, imaging control unit 5, display control unit 6, developing control unit 7, saving control unit 8, or the like operates according to power supplied from the power source block BTB. Also, each circuit block such as the main control unit 12, imaging control unit 5, display control unit 6, developing control unit 7, saving control unit 8, or the like executes various types of processing in sync with a predetermined first operation clock generated by the clock generating unit CL.

With such an arrangement, upon a power on command being input to the operating unit 13 by the user's operation, the main control unit 12 reads out the initial program from the ROM 15 to the volatile memory 17 via the bus 16 in accordance with the internal main control program.

Note that this volatile memory 17 is made up of SRAM (Static Random Access Memory), DRAM (Dynamic Random Access Memory), or the like. Also, in the following description, the volatile memory 17 to which the initial program, various types of boot programs, and the like are read out from the ROM 15 may also be referred to as "program buffer 17".

Also, the main control unit 12 reads out various types of boot programs from the ROM 15 to the program buffer 17 via the bus 16, in accordance with the initial program loaded to the program buffer 17. Further, the main control unit 12 controls the imaging control unit 5, display control unit 6, developing control unit 7, and saving control unit 8 in accordance with the internal main control program.

Thus, under the control of the main control unit 12, the imaging control unit 5, display control unit 6, developing control unit 7, and saving control unit 8 execute control unit start-up processing for enabling various types of processing to be executed in accordance with the corresponding boot program loaded to the program buffer 17.

Note that the control unit start-up processing that each of the imaging control unit 5, display control unit 6, developing control unit 7, and saving control unit 8 executes under the control of the main control unit 12 is part of the above device start-up processing. In the following description, control unit start-up processing for allowing the imaging control unit 5 itself to execute various types of processing will also be referred to particularly as imaging start-up processing. Also, in the following description, control unit start-up processing for allowing the display control unit 6 itself to execute various types of processing will also be referred to particularly as display start-up processing.

Further, in the following description, control unit start-up processing for allowing the developing control unit 7 itself to execute various types of processing will also be referred to particularly as developing start-up processing. Further, in the following description, control unit start-up processing for allowing the saving control unit 8 itself to execute various types of processing will also be referred to particularly as saving start-up processing.

Thus, each of the imaging control unit 5, display control unit 6, developing control unit 7, and saving control unit 8 can execute various types of processing, and reads out various types of program from the ROM 15 to the program buffer 17 via the bus 16.

Subsequently, the imaging control unit 5, display control unit 6, developing control unit 7, and saving control unit 8 control each circuit block to be controlled such as an imaging processing block 20, a display unit 21, a media drive 22, or the like in accordance with various types of program loaded to the program buffer 17.

Also, the imaging control unit 5, display control unit 6, developing control unit 7, and saving control unit 8 execute various types of processing corresponding to various types of command given from the operating unit 13 via the main control unit 12 in accordance with various types of program loaded to the program buffer 17.

Here, with the imaging processing block 20, a camera lens unit 25, an analog processing unit 26, an analog digital converter 27, and a digital processing unit 28 are provided. Also, with the camera lens unit 25, an imaging lens 25A, an optical element such as a diaphragm (not shown) for adjusting exposure, a shutter 25B, and an imaging device 25C are disposed and formed in order along an optical axis.

Further, the imaging device 25C is formed of a CCD (Charge Coupled Device) image sensor, CMOS (Complementary Metal Oxide Semiconductor) image sensor, or the like. Further, the display unit 21 is formed of a liquid crystal display, organic EL (Electro Luminescence) display, or the like.

Further, the digital still camera 1 also has an external media slot formed with a storage medium 29 formed of non-volatile memory stored within a case having a predetermined shape, for example. External media can be detachably mounted to the digital still camera 1 by way of the slot.

In an actual arrangement, the imaging control unit 5 controls the imaging processing block 20 to execute imaging processing for moving images for imaging a subject for moving image shooting when in an imaging mode.

At this time, the imaging control unit 5 automatically adjusts focus and exposure as to a subject by subjecting the camera lens unit 25 of the imaging processing block 20 to driving control as appropriate. Thus, with the imaging processing block 20, the imaging device 25C receives, in a state in which focus and exposure as to a subject has been automatically adjusted, imaging light L1 transmitted through the imaging lens 25A arriving from the subject thereof at a light-receiving face via the diaphragm and the shutter 25B.

The imaging device 25C performs sequential photoelectric conversion of the imaging light L1 received at the light-receiving face thereof at a predetermined cycle for moving image shooting of the subject, to generate analog moving image photoelectric conversion signals corresponding to this imaging light L1, and also sends the generated moving image photoelectric conversion signals to the analog processing unit 26.

Each time moving image photoelectric conversion signals are provided from the imaging device 25C, the analog processing unit 26 subjects the moving image photoelectric conversion signals to predetermined analog processing such as noise reduction processing, so as to generate moving image imaging signals.

Also, each time that moving image imaging signals are generated, the analog processing unit 26 converts the generated moving image imaging signals into digital moving image imaging data by way of the analog/digital converter 27 and sends these to the digital processing unit 28.

Each time that moving image imaging data is provided from the analog/digital converter 27, the digital processing unit 28 subjects the moving image imaging data to predetermined digital processing such as shading correction processing and the like.

The digital processing unit 28 sends the moving image imaging data subjected to the predetermined digital processing to volatile memory 30 such as SRAM or DRAM via the bus 16, for temporary storage. Note that hereinafter, the volatile memory 30 for temporarily storing the moving image imaging data may also be referred to as "imaging buffer 30".

Thus, the imaging processing block 20 executes moving image imaging processing under the control of the imaging control unit 5, thereby sequentially imaging subjects at a predetermined cycle for moving image shooting to generate moving image imaging data and temporarily store this in the imaging buffer 30.

At this time, the display control unit 6 executes moving image display processing, so that each time moving image imaging data is temporarily stored in the imaging buffer 30, the moving image imaging data is read out from the imaging buffer 30 via the bus 16.

Also, the display control unit 6 subjects the moving image imaging data read out from the imaging buffer 30 to predetermined image generating processing, such as trimming processing corresponding to the aspect ratio of the display screen of the display unit 21, image reduction processing wherein pixels are thinned out in accordance with the resolution of the display screen, and so forth.

Thus, the display control unit 6 sequentially generates multiple temporally-consecutive sets of unit image data which make up the moving image data, based on the moving image imaging data sequentially generated by the digital processing unit 28. The display control unit 6 then sends the sequentially generated unit image data to the display unit 21 via the bus 16.

Thus, the display control unit 6 causes display on the display unit 21 of multiple unit images based on multiple temporally-consecutive sets of unit image data, in a consecutive manner as a moving image.

In this way, the display control unit 6 displays, on the display unit 21, a moving image obtained by consecutively imaging a subject (i.e., shooting a moving image thereof), so that the user can confirm the imaging state of the subject by viewing the moving image.

Incidentally, the movement detecting unit 11 sequentially detects acceleration generated at the digital still camera 1 at a predetermined cycle by the acceleration sensor when in the imaging mode, and also transmits acceleration detected data indicating this detected acceleration to the main control unit 12.

Also, the movement detecting unit 11 sequentially detects angular velocity generated at the digital still camera 1 at a predetermined cycle by the angular velocity sensor when in the imaging mode, and also transmits angular velocity detected data indicating this detected angular velocity to the main control unit 12.

Upon the release key being operated by the user and an imaging command for shooting being input from the operating unit 13, at this time the main control unit 12 transmits an imaging command to the imaging control unit 5 via the bus 16 along with the acceleration detected data and angular velocity detected data given from the movement detecting unit 11.

Subsequently, upon the acceleration detected data and angular velocity detected data being given from the main control unit 12 along with the imaging command, the imaging control unit 5 controls the imaging processing block 20 to execute photography imaging processing to image a subject for photography shooting.

At this time, the imaging control unit 5 adjusts, for example, the position of the imaging lens 25A at the camera lens unit 25 based on the acceleration detected data and angular velocity detected data thereof. Thus, the imaging control unit 5 corrects shaking generated at the digital still camera 1 by the user holding the digital camera 1 by the hand and tilting this against a subject.

Also, the imaging control unit 5 drives the shutter 25B of the camera lens unit 25 according to the imaging command in such a shaking-corrected state. Thus, the imaging control unit 5 exposes the light-receiving face of the imaging device 25C with imaging light L1, at a predetermined shutter speed for photography shooting.

At this time, the imaging device 25C performs photoelectric conversion of the imaging light L1 whereby the light-receiving face has been exposed, and generates photography photoelectric conversion signals corresponding to the imaging light L1 whereby exposure has been performed. The imaging device 25C then sends the photography photoelectric conversion signals to the analog processing unit 26.

The analog processing unit 26 subjects the photography photoelectric conversion signals provided from the imaging device 25C to analog processing such as described above, so as to generate photography imaging signals. The analog processing unit 26 then converts the photography imaging signals into photography imaging data by way of the analog/digital converter 27, and sends to the digital processing unit 28.

The digital processing unit 28 subjects the photography imaging data provided from the analog/digital converter 27 to digital processing such as described above, and then sends the photography imaging data to the imaging buffer 30 via the bus 16, so as to temporarily store the photography imaging data in the imaging buffer 30.

Thus, the imaging processing block 20 executes the photography imaging processing under the control of the imaging control unit 5, thereby imaging a subject for photography shooting to generate photography imaging data and temporarily storing this in the imaging buffer 30.

At this time, the developing control unit 7 performs developing processing, wherein the photography imaging data temporarily stored in the imaging buffer 30 is read out from the imaging buffer 30 via the bus 16.

The developing control unit 7 then subjects the photography imaging data read out from the imaging buffer 30 to predetermined image generating processing, such as trimming processing corresponding to a predetermined aspect ratio selected beforehand for photography images, image reduction processing wherein pixels are thinned out in accordance with an image size selected beforehand for photography images, and so forth. Thus, the developing control unit 7 generates photography image data based on the photography imaging data (hereinafter also referred to as "photograph image data").

Moreover, the developing control unit 7 subjects the photograph image data thereof to compression encoding processing with a predetermined compression encoding method such as JPEG (Joint Photographic Experts Group). Thus, the developing control unit 7 ultimately obtains compression-encoded photograph image data (hereinafter also referred to as "compressed photograph image data").

The developing control unit 7 then sends the compressed photograph image data thereof to volatile memory 31 such as SRAM or DRAM via the bus 16 so as to be temporarily stored. Note that in the following description, the volatile memory 31 for temporarily storing the compressed photograph image data may also be referred to as "image buffer 31".

The saving control unit 8 executes saving processing at this time, thereby reading out the temporarily stored compressed photograph image data from the image buffer 31, via the bus 16.

The saving control unit 8 also adds header data, storing various types of information in accordance with Exif (Exchangeable image file format), to the header portion of the compressed photograph image data, thereby generating compressed photograph image data for saving (hereinafter may be referred to as "saving photograph image data").

The saving control unit 8 sequentially transfers the saving photograph image data to an external medium via the bus 16 and media drive 22 in that order, whereby the saving control unit 8 stores the saving photograph image data in the storage medium 29 within the external media.

Thus, the saving control unit 8 can save saving photograph image data generated by imaging a subject for photograph shooting in accordance with operation of a release key, in external media.

On the other hand, when in a reproducing mode, upon saving photograph image data being selected by the user by way of the operating unit 13, the main control unit 12 notifies the saving control unit 8 of the selected saving photograph image data thereof via the bus 16.

In response to the notification from the main control unit 12, the saving control unit 8 reads out the selected saving photograph image data from the storage medium 29 within the external media, via the bus 16 and media drive 22 in that order. The saving control unit 8 then sends the saving photograph image data to the display control unit 6 via the bus 16.

The display control unit 6 separates the saving photograph image data provided from the saving control unit 8 into compressed photograph image data and header data. The display control unit 6 then performs decoding processing of the compressed photograph image data in accordance with various types of information in the header data, thereby generating the original photograph image data, and also subjects the photograph image data thereof to correction processing and the like as appropriate.

The display control unit 6 also subjects the photography image data to trimming processing corresponding to the aspect ratio of the display screen of the display unit 21, image reduction processing wherein pixels are thinned out in accordance with the display screen, and so forth, thereby generating display photograph image data.

The display control unit 6 then sends the display photograph image data to the display unit 21 via the bus 16. Thus, the display control unit 6 displays the photograph image based on the display photograph image data on the display unit 21. Accordingly, the display control unit 6 allows the user to view the photograph image obtained by imaging a subject for photograph shooting, by way of the display unit 21.

1-2. Digital Still Camera Start-Up Processing

Next, description will be made regarding camera start-up control processing in the imaging mode executed by the main control unit 12 controlling the imaging control unit 5, display control unit 6, developing control unit 7, and saving control unit 8, with reference to FIG. 2 through 6.

The main control unit 12 operates by receiving the stipulated operation power supply from the power source block BTB in any of the power-on state and the power-off state of the digital still camera 1 (i.e., all the time).

Also, the main control unit 12 executes various types of processing using the first operation clock generated by the clock generating unit CL in any of the power-on state and the power-off state of the digital still camera 1.

Further, the main control unit 12 causes the power source block BTB to supply the stipulated operation power to the operating unit 13 and causes this operating unit 13 to operate so as to input various types of command in any of the power-on state and the power-off state (i.e., all the time).

Further, when in the imaging mode in a power-on state, the main control unit 12 causes the power source block BTB to supply the stipulated operation power to the movement detecting unit 11 and causes this movement detecting unit 11 to operate such as described above. Further, even in a power-off state, the main control unit 12 causes the power source block BTB to supply the stipulated operation power to the movement detecting unit 11 and causes this movement detecting unit 11 to operate.

Note that the movement detecting unit 11 executes acceleration and angular velocity detecting processing using the first operation clock when in the imaging mode in a power-on state, or in a power-off state.

Here, a power lamp is provided to the armor case of the digital still camera 1. Upon a power on command being input via the operating unit 13, the main control unit 12 turns on the power lamp since input of this power on command until input of a power off command.

Also, upon a power off command being input via the operating unit 13, the main control unit 12 turns off the power lamp since input of this power off command until input of a power on command. That is to say, the main control unit 12 turns on/off the power lamp in sync with input of a power on command/power off command.

Each circuit block such as the imaging control unit 5, display control unit 6, developing control unit 7, saving control unit 8, or the like executes various types of processing using the first operation clock since input of a power on command until input of a power off command, thereby realizing the above imaging function and the like.

Also, each circuit block such as the imaging control unit 5, display control unit 6, developing control unit 7, saving control unit 8, or the like basically stops operation since input of a power off command until input of a power on command, thereby preventing the above imaging function and the like from being realized.

Accordingly, as far as the user is concerned, while the power lamp is on, the digital still camera 1 externally appears to operate, and while the power lamp is off, even In an actual arrangement the main control unit 12 and the like operate, the digital still camera 1 externally appears not to operate.

Accordingly, the power-on state of the digital still camera 1 is a state in which this digital still camera 1 can actually realize the imaging function since input of a power on command until input of a power off command, and also externally appears to operate.

Also, the power-off state of the digital still camera 1 is a state in which this digital still camera 1 externally appears to stop operation since input of a power off command until input of a power on command.

Accordingly, in the power-off state of the digital still camera 1, while pretending that the digital still camera 1 externally appears to completely stop operation as to the user, the main control unit 12 itself operates along with the movement detecting unit 11 and the operating unit 13. The main control unit 12 controls the movement detecting unit 11 in accordance with the internal main control program even in a power-off state.

Thus, the movement detecting unit 11 sequentially detects acceleration generated at the digital still camera 1 at a predetermined cycle by the acceleration sensor even in a power-off state, and also transmits acceleration detected data indicating this detected acceleration to the main control unit 12.

Also, the movement detecting unit 11 sequentially detects angular velocity generated at the digital still camera 1 at a predetermined cycle by the angular velocity sensor even in a power-off state, and also transmits angular velocity detected data indicating this detected angular velocity to the main control unit 12.

For example, in order to photographically shoot a subject by the user, upon the digital still camera 1 being taken out from a pocket of clothing or from out of a bag, or being moved from the bodily side to the front of the face while being held in the hand, or the like, relatively great acceleration is generated at the digital still camera 1.

Also, for example, in order to photographically shoot a subject by the user, upon the digital still camera 1 being held with both hands again from a state being held with one hand, or being rotated so as to direct the imaging lens 25A to the subject, or the like, relatively great angular velocity is generated at the digital still camera 1.

Note that, for example, the quicker the user moves the digital still camera 1 so as not to let a chance slip, the greater the value of the acceleration or angular velocity generated at the digital still camera 1 is.

Accordingly, the main control unit 12 holds a threshold for acceleration selected as appropriate beforehand to determine whether or not the relatively rapid movement of the digital still camera 1 has been detected by the movement detecting unit 11 as acceleration.

Also, the main control unit 12 holds a threshold for angular velocity selected as appropriate beforehand to determine whether or not the relatively rapid rotation of the digital still camera 1 has been detected by the movement detecting unit 11 as angular velocity.

Incidentally, when the digital still camera 1 is used for photography shooting of a subject by the user, for example, after the digital still camera 1 is moved from a pocket of clothing or from out of a bag, or from the bodily side to the front of the face, the digital still camera 1 is frequently held with both hands from one hand again so as to direct the imaging lens 25A to the subject.

When the digital still camera 1 is used for photography shooting of a subject by the user, upon the digital still camera 1 being moved with such a series of movement, first relatively great acceleration is generated, and thereafter, relatively great angular velocity is generated while the acceleration decreases, with the digital still camera 1.

Accordingly, the main control unit 12 holds determination conditions beforehand selected for determining whether or not such a series of movement (i.e., particular movement) of the digital still camera 1 have been detected as acceleration and angular velocity by the movement detecting unit 11.

That is to say, with the determination conditions, for example, sequence for comparing the acceleration and angular velocity generated at the digital still camera 1 with an acceleration threshold and an angular velocity threshold, a comparative period (i.e., time) between acceleration and the acceleration threshold, and between angular velocity and the angular velocity threshold, and the like are stipulated.

Specifically, with the determination conditions, it is stipulated to compare the acceleration generated at the digital still camera 1 and the acceleration threshold and determine whether or not angular velocity equal to or greater than the angular velocity threshold has occurred within a selected predetermined comparative duration since the acceleration equal to or greater than the acceleration threshold occurred.

Thus, in a power-off state, each time the acceleration detected data and angular velocity detected data are given from the movement detecting unit 11, the main control unit 12 compares the acceleration that the acceleration detected data thereof indicates with the acceleration threshold in accordance with the determination conditions.

As a result thereof, the main control unit 12 determines that the relatively rapid movement of the digital still camera 1 has not been detected by the movement detecting unit 11 while the acceleration generated at the digital still camera 1 is smaller than the acceleration threshold.

Also, upon the acceleration reaching or exceeding the acceleration threshold, the main control unit 12 determines that the relatively rapid movement of the digital still camera 1 has been detected by the movement detecting unit 11. Subsequently, the main control unit 12 starts counting of the comparative duration by an internal timer from the time of this acceleration reaching or exceeding the acceleration threshold (acceleration equal to or greater than the acceleration threshold occurring at the digital still camera 1), in accordance with the determination conditions.

Further, from the time of the acceleration thereof reaching or exceeding the acceleration threshold, each time the acceleration detected data and angular velocity detected data are given from the movement detecting unit 11, the main control unit 12 compares the angular velocity that the angular velocity detected data thereof indicates with the angular velocity threshold.

As a result thereof, when the angular velocity is smaller than the angular velocity threshold, the main control unit 12 determines that the relatively rapid rotation of the digital still camera 1 has not been detected by the movement detecting unit 11.

Subsequently, even in the event of reaching the comparative duration from the time of the acceleration reaching or exceeding the acceleration threshold, when the angular velocity is still smaller than the angular velocity threshold, the main control unit 12 starts to compare the acceleration that the acceleration detected data indicates and the acceleration threshold in the same way as described above in accordance with the determination conditions again.

Thus, the main control unit 12 repeatedly executes comparison between the acceleration threshold and the acceleration generated at the digital still camera 1, and comparison between the angular velocity threshold and the angular velocity generated at the digital still camera 1 as appropriate.

Also, before reaching the comparative duration from the time of the acceleration reaching or exceeding the acceleration threshold, upon the angular velocity reaching or exceeding the angular velocity threshold, at that time the main control unit 12 determines that the particular movement (above series of movement) of the digital still camera 1 has been detected by the movement detecting unit 11.

That is to say, the main control unit 12 determines that the relatively rapid movement and the relatively rapid rotation of the digital still camera 1 have continuously been detected by the movement detecting unit 11.

Thus, in the power-off state of the digital still camera 1, the main control unit 12 monitors whether or not the particular movement of this digital still camera 1 has been detected by the movement detecting unit 11.

However, in a state in which the particular movement of the digital still camera 1 has not been detected by the movement detecting unit 11, upon a power on command being input via the operating unit 13 by the user, the main control unit 12 starts input origin start-up control processing at the time of input thereof.

Figure 2:
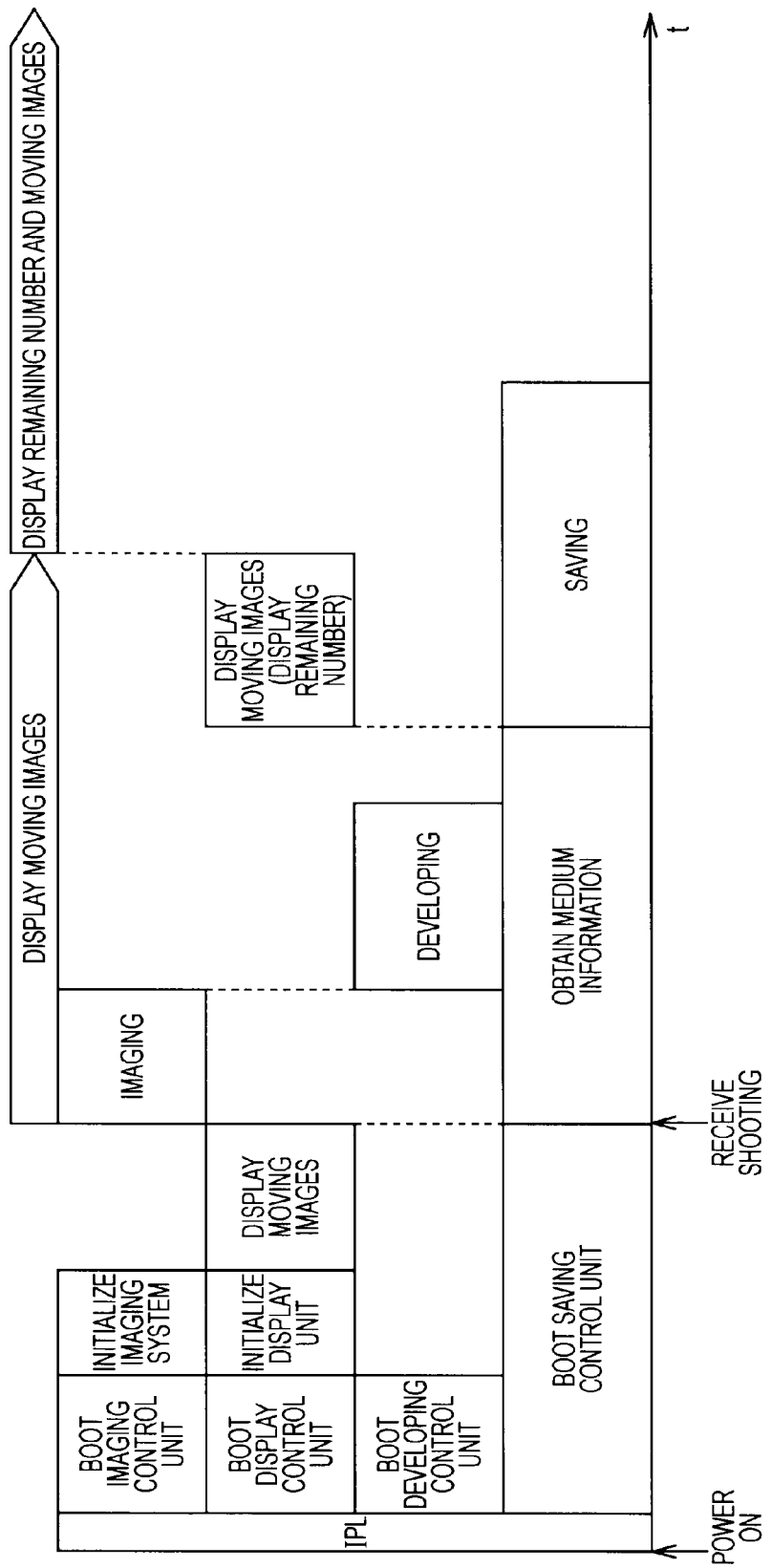
FIG. 2 is a schematic line drawing for describing input origin start-up control processing.

As shown in FIG. 2, upon starting the input origin start-up control processing, the main control unit 12 reads out the initial program from the ROM 15 to the program buffer 17 via the bus 16 in accordance with the internal main control program.

Also, the main control unit 12 reads out each boot program from the ROM 15 to the program buffer 17 via the bus 16 in accordance with the initial program loaded to the program buffer 17.

Further, at this time, the main control unit 12 sets the first operation clock to the operation clock at the time of executing various types of processing as to the control block 9 (i.e., the imaging control unit 5, display control unit 6, developing control unit 7, and saving control unit 8) in accordance with the main control program.

Subsequently, the main control unit 12 causes the imaging control unit 5, display control unit 6, developing control unit 7, and saving control unit 8 to execute imaging start-up processing, display start-up processing, developing start-up processing, and saving start-up processing as device start-up processing in accordance with the main control program.

In an actual arrangement, the main control unit 12 controls the imaging control unit 5, display control unit 6, developing control unit 7, and saving control unit 8 to start imaging start-up processing, display start-up processing, developing start-up processing, and saving start-up processing at the same time.

Thus, the imaging control unit 5, display control unit 6, developing control unit 7, and saving control unit 8 each input the stipulated operating power from the power source block BTB, and start their intended operations.

Subsequently, the imaging control unit 5, display control unit 6, developing control unit 7, and saving control unit 8, each start their respective imaging start-up processing, display start-up processing, developing start-up processing, and saving start-up processing, following the corresponding boot programs loaded to the program buffer 17, at nearly the same time.

At this time, upon starting the imaging start-up processing, the imaging control unit 5 first executes imaging control unit boot processing for booting itself, following the corresponding boot program loaded to the program buffer 17. Accordingly, the imaging control unit 5 performs initialization of work area, setting of variables used for various types of processing which it performs, and so on.

Upon such imaging control unit boot processing being completed, the imaging control unit 5 then performs imaging system initialization processing for initializing the imaging processing block 20 in accordance with the corresponding boot program loaded to the program buffer 17.

Accordingly, the imaging control unit 5 sets focal length, exposure values, and shutter speed, to predetermined values at the camera lens unit 25 of the imaging processing block 20, and also performs initialization processing and the like of the analog processing unit 26, analog/digital converter 27, and digital processing unit 28. Upon completing the imaging system initialization processing, the imaging control unit ends the imaging start-up processing.

Thus, the imaging control unit 5 sequentially executes a series of imaging control unit boot processing and imaging system initialization processing serving as imaging start-up processing using the first operation clock according to the setting of the operation clock as to the control block 9.

Also, upon starting the display start-up processing, the display control unit 6 first executes display control unit boot processing for booting itself, following the corresponding boot program loaded to the program buffer 17. Accordingly, the display control unit 6 performs initialization of work area, setting of variables used for various types of processing which it performs, and so on.

Upon such display control unit boot processing being completed, the display control unit 6 then performs display unit initialization processing for initializing the display unit 21 in accordance with the corresponding boot program loaded to the program buffer 17. Accordingly, the display control unit 6 initializes the display unit 21, and also turns on the backlight of the display unit 21. Upon the display unit initialization processing being completed, the display control unit 6 ends the display start-up processing.

Thus, the display control unit 6 executes a series of display control unit boot processing and display unit initialization processing, in that order, as display start-up processing using the first operation clock according to the setting of the operation clock as to the control block 9.

Further, upon starting the developing start-up processing, the developing control unit 7 executes developing control unit boot processing for booting itself, following the corresponding boot program loaded to the program buffer 17. Accordingly, the developing control unit 7 performs initialization of work area, setting of variables used for various types of processing which it performs, and so on. Upon the developing control unit boot processing being completed, the developing control unit 7 ends the developing start-up processing.

Thus, the developing control unit 7 executes developing control unit boot processing as developing start-up processing using the first operation clock according to the setting of the operation clock as to the control block 9.

Moreover, upon starting the saving start-up processing, the saving control unit 8 first executes saving control unit boot processing for booting itself, following the corresponding boot program loaded to the program buffer 17. Accordingly, the saving control unit 8 performs initialization of work area, setting of variables used for various types of processing which it performs, and so on.

Upon such saving control unit boot processing being completed, the saving control unit 8 then performs medium information obtaining processing in accordance with the corresponding boot program loaded to the program buffer 17. Accordingly, the saving control unit 8 obtains medium information from the storage medium 29 within the external media, via the bus 16 and media drive 22 in that order. Upon the medium information obtaining processing being completed, the saving control unit 8 ends the saving start-up processing.

Note that medium information is information indicating the state of formatting of the storage medium 29 (whether formatted or not), the number of saving photograph image data which can still be stored in the storage medium 29 at that point (i.e., empty space in the storage medium 29), and so on.

Thus, the saving control unit 8 executes a series of saving control unit boot processing and medium information obtaining processing, in that order, as saving start-up processing using the first operation clock according to the setting of the operation clock as to the control block 9. Upon the saving start-up processing ending, the main control unit 12 ends the input origin start-up control processing in accordance with the ending thereof.

Incidentally, the imaging control unit 5 executes imaging start-up processing using a boot program called a real-time OS, dedicated for imaging start-up processing, with a markedly small data amount and a simple structure.

Also, the display control unit 6 executes display start-up processing using a start-up program dedicated for display start-up processing (i.e., real-time OS), with a markedly small data amount and a simple structure.

Further, the developing control unit 7 executes developing start-up processing using a start-up program dedicated for developing start-up processing (i.e., real-time OS), with a markedly small data amount and a simple structure.

Accordingly, the imaging control unit 5, display control unit 6, and developing control unit 7 can execute the respective imaging start-up processing, display start-up processing, and developing start-up processing, in a much shorter time as compared to a case of using general-purpose boot programs.

On the other hand, the saving control unit 8 performs saving start-up processing using a boot program called a multimedia OS, with a relatively great amount of data and a somewhat complicated structure, such as Linux.

Accordingly, the saving control unit 8 takes a little longer processing time for the saving start-up processing as compared to a case of using a dedicated boot program. That is to say, with the digital still camera 1, the processing time which the saving control unit 8 uses for the saving start-up processing is a little longer.

Actually, the imaging control unit 5, display control unit 6, and developing control unit 7 can execute the respective imaging control unit boot processing, display control unit boot processing, and developing control unit boot processing, as the imaging start-up processing, display start-up processing, and developing start-up processing, at nearly the same processing time.

The digital still camera 1 is arranged so that, of these, the developing control unit boot processing alone which the developing control unit 7 executes as developing start-up processing, so that of the imaging start-up processing, display start-up processing, and developing start-up processing, the developing start-up processing can be executed in the shortest time of all.

Also, with the digital still camera 1, for example, the imaging start-up processing and the display start-up processing take a slightly longer amount of processing time than the processing time used for developing start-up processing, but the imaging start-up processing and the display start-up processing are arranged to be executed at nearly the same processing time.

Conversely, the saving control unit 8 executes the saving control unit boot processing serving as saving start-up processing using a general-purpose boot program. Accordingly, with the digital still camera 1, the saving control unit boot processing takes slightly longer processing time as compared to the imaging control unit boot processing, display control unit boot processing, and developing control unit boot processing.

Also, the saving control unit 8 executes the medium information obtaining processing serving as saving start-up processing while communicating with the storage medium 29 of the external media via the bus 16 and media drive 22 in that order, following the general-purpose boot program. Accordingly, with the digital still camera 1, the medium information obtaining processing also takes a little longer processing time.

Thus, with the digital still camera 1, of the imaging start-up processing, display start-up processing, developing start-up processing, and saving start-up processing, executed by the imaging control unit 5, display control unit 6, developing control unit 7, and saving control unit 8, the processing time of the saving start-up processing which the saving control unit 8 executes is the longest.

However, as described above, with the digital still camera 1, the imaging control unit 5, display control unit 6, developing control unit 7, and saving control unit 8 start and are performing the imaging start-up processing, display start-up processing, developing start-up processing, and saving start-up processing at almost the same time, in parallel.

Accordingly, with the digital still camera 1, the imaging start-up processing, display start-up processing, and developing start-up processing, executed by the imaging control unit 5, display control unit 6, and developing control unit 7, have all ended within the processing time of the saving start-up processing executed by the saving control unit 8.

That is to say, with the digital still camera 1, the amount of time from input of the power on command till ending of the imaging start-up processing, display start-up processing, developing start-up processing, and saving start-up processing, executed by the imaging control unit 5, display control unit 6, developing control unit 7, and saving control unit 8, is reduced as much as possible.

Incidentally, upon the imaging start-up processing ending, the imaging control unit 5 reads out an imaging control program stored beforehand in the ROM 15 from the ROM 15 to the program buffer 17 via the bus 16. Subsequently, the imaging control unit 5 controls the imaging processing block 20 so as to execute the same moving image imaging processing as described above in accordance with the imaging control program loaded to the program buffer 17.

However, at this time, the imaging control unit 5 controls the imaging processing block 20 so as to execute the moving image imaging processing using the first operation clock so as to synchronize with the control of itself in accordance with the setting of the operation clock as to the control block 9.

Thus, upon the imaging start-up processing ending even while executing the input origin start-up control processing, the imaging processing block 20 executes the moving image imaging processing using the first operation clock in the same way as described above.

That is to say, the imaging processing block 20 generates moving image imaging data by periodically imaging the subject for moving image shooting, and also temporarily stores the generated moving image imaging date in the imaging buffer 30.

Also, upon the display start-up processing ending even during the input origin start-up control processing, the display control unit 6 reads out a display processing program stored beforehand in the ROM 15 from this ROM 15 via the bus 16 to the program buffer 17.

The display control unit 6 executes the moving image display processing in accordance with the display processing program loaded to the program buffer 17. Thus, the display control unit 6 reads out the first moving image imaging data temporarily stored from the imaging buffer 30 to generate unit image data, and also sends this generated unit image data to the display unit 21 via the bus 16.

Also, upon sending of the first unit image data to the display unit 21 being completed, the display control unit 6 then executes moving image display processing. Accordingly, the display control unit 6 reads out the second moving image imaging data from the imaging buffer 30 where it has been temporarily stored, generates unit image data thereof, and sends the generated unit image data to the display unit 21 via the bus 16.

Thus, the display control unit 6 sequentially executes the moving image display processing from the ending point of the display start-up processing using the first operation clock according to the setting of the operation clock as to the control block 9. Thus, the display control unit 6 displays the moving image obtained by imaging a subject for moving image shooting on the display unit 21.

It should be noted that FIG. 2 illustrates, of the moving image display processing which the display control unit 6 sequentially executes, only the moving image display processing for generating the first unit image data and sending this to the display unit 21.

However, as described above, the display control unit 6 continues to sequentially execute the moving image display processing even after sending the first unit image data to the display unit 21, though not shown in the drawing.

Also, upon the medium information obtaining processing executed as the saving start-up processing ending, for example, the saving control unit 8 starts notifying the display control unit 6 of the number of remaining saving photograph image data which can still be stored in the storage medium 29 at the point in time of completion, as medium information.

Accordingly, upon notification of the remaining number from the saving control unit 8 starting, the display control unit 6 executes the moving image display processing using the remaining number from the start point of this notification. In this case, the display control unit 6 generates unit information data, and also sends the unit information data thereof to the display unit 21 via the bus 16, in a manner composited with text data indicating the remaining number.

Accordingly, after notification of the remaining number from the saving control unit 8 starting, the display control unit 6 displays the moving image (i.e., each unit image) on the display unit 21 with remaining-number text indicating the remaining number superimposed thereupon.

Thus, the display control unit 6 can allow the user to recognize the number of remaining saving photograph image data which still can be recorded in the storage medium 29 with text on the moving image, indicating the remaining number, after notification of the remaining number from the saving control unit 8 starting.

Note that subsequently, each time a saving photograph image data is stored in the storage medium 29 of the external media, the saving control unit 8 updates the remaining number by decrementing one at a time, and also notifies the display control unit 6 of the updated remaining number.

Thus, each time the updated remaining number being notified from the saving control unit 8, the display control unit 6 also updates the text data to be composited with the unit image data to that indicating the notified remaining number.

It should be noted that FIG. 2 illustrates, of the moving image display processing which the display control unit 6 sequentially executes using the remaining number, only the moving image display processing for compositing text data to the unit image data initially. However, the display control unit 6 continues to sequentially execute the moving image display processing wherein text data indicating the remaining number is composited with the unit image data, even after the moving image display processing wherein text data is composited with the unit image data initially, though not shown in the drawing.

Incidentally, upon executing the moving image display processing to start display of moving images on the display unit 21 (i.e., display the first unit image of temporally consecutive multiple unit images making up a moving image), the display control unit 6 notifies the main control unit 12 of display start thereof.

Subsequently, upon display start of moving images being notified from the display control unit 6, at this time the main control unit 12 starts reception of input of an imaging command for photography shooting by the operation of the release key.

Here, with the digital still camera 1, even in the case of imaging a subject with any of for photography shooting and for moving image shooting, the same camera lens unit 25 is used.

Accordingly, the display control unit 6 displays a moving image on the display unit 21, whereby the user can be allowed to confirm the imaging state of the subject from the moving image thereof beforehand, i.e., upon photographically shooting the subject, the user can be allowed to confirm beforehand what kind of pictorial composition can be obtained.

That is to say, the display control unit 6 displays a moving image on the display unit 21, whereby the user can be allowed to confirm that photography shooting of a subject can be executed.

Thus, the main control unit 12 starts reception of input of an imaging command in sync with display start of moving images on the display unit 21 by the display control unit 6 such as described above.

Accordingly, when starting reception of input of an imaging command, the main control unit 12 can allow the user to intuitively confirm that photography shooting of a subject can be executed according to display start of moving images on the display unit 21 without using a particular notifying method.

Subsequently, upon an imaging command being input via the operating unit 13 by the user after display start of moving images, the main control unit 12 transmits this imaging command to the imaging control unit 5 via the bus 16 along with the acceleration detected data and the angular velocity detected data given from the movement detecting unit 11 at this time.

Upon the acceleration detected data and the angular velocity detected data being given from the main control unit 12 along with the imaging command, the imaging control unit 5 controls the imaging processing block 20 so as to execute the photography imaging processing in the same way as described above in accordance with the imaging control program.

Note that at this time, the imaging control unit 5 controls the imaging processing block 20 so as to execute the photography imaging processing using the first operation clock so as to synchronize with the control of itself according to the setting of the operation clock as to the control block 9.

Thus, the imaging processing block 20 executes the photography imaging processing using the first operation clock in the same way as described above. Specifically, the imaging processing block 20 images the subject for photography shooting to generate photography imaging data and temporarily store this in the imaging buffer 30.

Upon the photography imaging data temporarily being stored in the imaging buffer 30 by the imaging processing block 20 (i.e., ending the photography imaging processing), the main control unit 12 accepts input of imaging commands again.

Thus, upon an imaging command being input by the user pressing the release key after display start of moving images, the main control unit 12 accordingly causes the imaging processing block 20 to image a subject for photography shooting and store the photography imaging data in the imaging buffer 30.

Upon the developing start-up processing ending, the developing control unit 7 reads out, from the ROM 15, a developing processing program stored therein beforehand, via the bus 16 to the program buffer 17.

Further, the developing control unit 7 follows the developing processing program loaded to the program buffer 17 and awaits temporary storage in the imaging buffer 30 of photography imaging data which has not been subjected to the developing processing (i.e., unprocessed).

Upon detecting unprocessed photography imaging data temporarily stored in the imaging buffer 30, the developing control unit 7 executes the developing processing using the first operation clock in the same way as described above, following the developing processing program.

Accordingly, the developing control unit 7 reads out unprocessed photography imaging data from the imaging buffer 30, and also generates compressed photograph image data based on the photography imaging data that has been read out, and temporarily stores the compressed photograph image data in the image buffer 31.

Note that, upon ending temporary storage of the compressed photograph image data in the image buffer 31 (i.e., upon the developing processing for one photography imaging data being ended), the developing control unit 7 detects whether or not new photography imaging data has been temporarily stored in the imaging buffer 30.

Consequently, upon detecting that new photography imaging data having been temporarily stored in the imaging buffer 30, the developing control unit 7 executes the developing processing using the first operation clock again.

Thus, upon the developing start-up processing ending, the developing control unit 7 detects the photography imaging data that has been temporarily stored in the imaging buffer 30, in order from old to new in the period of temporary storing, and also executes the developing processing based on the detection results.

That is to say, the developing control unit 7 uses the photography imaging data that has been temporarily stored in the imaging buffer 30 in order from old to new in the period of temporary storing to generate compressed photograph image data, which is then temporarily stored in the image buffer 31.

Further, upon the saving start-up processing ending, the saving control unit 8 reads out, from the ROM 15, a saving processing program stored therein beforehand, via the bus 16 to the program buffer 17.

Also, the saving control unit 8 follows the saving processing program loaded to the program buffer 17 to detect whether or not there is temporarily stored in the image buffer 31 any compressed photograph image data which has not been subjected to saving processing (i.e., unprocessed).

Upon detecting that there is unprocessed compressed photograph image data temporarily stored in the image buffer 31, the saving control unit 8 executes the saving processing in the same way as described above, following the saving processing program loaded to the program buffer 17.

Accordingly, the saving control unit 8 reads out unprocessed compressed photograph image data from the image buffer 31. The saving control unit 8 then generates saving photograph image data based on the compressed photograph image data, and stores the generated saving photograph image data in the storage medium 29 of the external media.

Also, upon ending storing of the saving photograph image data in the storage medium 29 of the external media (i.e., upon saving processing of one compressed photograph image data ending), the saving control unit 8 detects whether or not there is new compressed photograph image data temporarily stored in the image buffer 31.

Consequently, upon detecting that there is new compressed photograph image data temporarily stored in the image buffer 31, the saving control unit 8 executes the saving processing using the first operation clock again.

Thus, upon the saving start-up processing ending, the saving control unit 8 detects the compressed photograph image data temporarily stored in the image buffer 31, in order from old to new according to the temporarily stored period, and executes the saving processing in accordance with the detected results thereof.

That is to say, the saving control unit 8 generates saving photograph image data using the compressed photograph image data temporarily stored in the image buffer 31, in order from old to new according to the temporarily stored period, and stores this in the storage medium 29 of the external media.

Thus, upon starting the input origin start-up control processing, the main control unit 12 causes the imaging control unit 5, display control unit 6, developing control unit 7, and saving control unit 8 to execute the imaging start-up processing, display start-up processing, developing start-up processing, and saving start-up processing as the device start-up processing in parallel.

Subsequently, the main control unit 12 ends, for example, even the saving control unit boot processing having the longest processing time of the imaging boot processing, display boot processing, developing boot processing, and saving control unit boot processing, after 0.5 through 1.5 seconds from the input point of a power on command according to the arrangement of the boot program.

Accordingly, the main control unit 12 starts, for example, display of moving images on the display unit 21 within 0.5 through 1.5 seconds from the input point of a power on command to enable photography shooting. That is to say, the main control unit 12 enables photography shooting of a subject as short time as possible from the input point of a power on command even while executing the input origin start-up control processing.

Also, even in a state in which photography shooting of a subject is enabled, the main control unit 12 causes the imaging control unit 5, display control unit 6, developing control unit 7, and saving control unit 8 to execute photography imaging processing, moving image display processing, developing processing, and saving processing in parallel.

Further, when photography imaging data is generated by the imaging processing block 20, the main control unit 12 temporarily stores this generated photography imaging data in the imaging buffer 30. Further, when compressed photograph image data is generated by the developing control unit 7, the main control unit 12 temporarily stores this generated compressed photograph image data in the image buffer 31.

Thus, for example, even when imaging commands are consecutively input immediately after photography shooting is enabled, the main control unit 12 can sequentially execute the photography imaging processing corresponding to the input thereof without being intercepted by the other saving start-up processing, developing processing, saving processing, or the like.

That is to say, the main control unit 12 enables photography shooting of a subject as soon as possible from input of a power on command, and after enabling this photography shooting, can continuously execute photography shooting of a subject.

Figure 3:
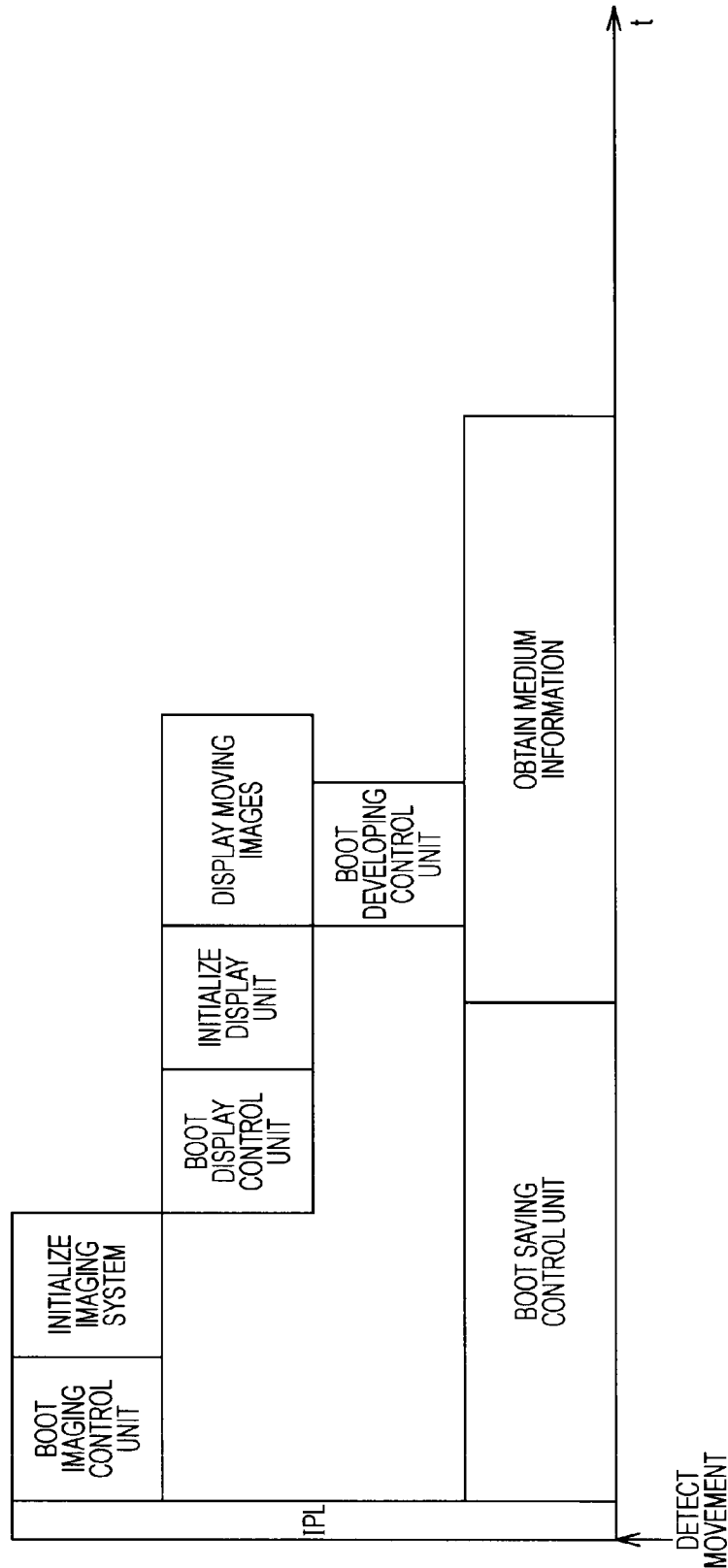
FIG. 3 is a schematic line drawing for describing discriminant origin start-up control processing.

On the other hand, as shown in FIG. 3, upon determining that the particular movement of the digital still camera 1 has been detected by the movement detecting unit 11 such as described above, the main control unit 12 starts discriminant origin start-up control processing at the determination time thereof prior to input of a power on command.

Upon starting the discriminant origin start-up control processing, the main control unit 12 reads out the initial program from the ROM 15 to the program buffer 17 via the bus 16 in accordance with the main control program.

Also, the main control unit 12 reads out each boot program from the ROM 15 to the program buffer 17 via the bus 16 in accordance with the initial program loaded to the program buffer 17.

Further, the main control unit 12 causes the imaging control unit 5, display control unit 6, developing control unit 7, and saving control unit 8 to execute the imaging start-up processing, display start-up processing, developing start-up processing, and saving start-up processing as device start-up processing in a first processing mode in accordance with the main control program.

Actually, at this time, the main control unit 12 sets the operation clock at the time of causing the control block 9 (i.e., imaging control unit 5, display control unit 6, developing control unit 7, and saving control unit 8) to execute various types of processing to predetermined second operation clock that is slower than the first operation clock in accordance with the main control program.

Subsequently, the main control unit 12 controls the imaging control unit 5 and the saving control unit 8 to start the imaging start-up processing and the saving start-up processing simultaneously in accordance with the main control program.

Thus, each of the imaging control unit 5 and the saving control unit 8 uptakes the stipulated operation power from the power source block BTB, and starts operation. Subsequently, the imaging control unit 5 and the saving control unit 8 start the imaging start-up processing and the saving start-up processing almost simultaneously in accordance with the corresponding boot program loaded to the program buffer 17.

At this time, the imaging control unit 5 executes the imaging control unit boot processing and the imaging system initialization processing similar to the above as the imaging start-up processing in that order using the second operation clock according to the setting of the operation clock as to the control block 9.

Also, the saving control unit 8 also executes the saving control unit boot processing and the medium information obtaining processing similar to the above as the saving start-up processing using the second operation clock according to the setting of the operation clock as to the control block 9.

Incidentally, upon the imaging start-up processing ending, the imaging control unit 5 notifies the main control unit 12 via the bus 16 that this imaging start-up processing ends. Upon the end of the imaging start-up processing being notified from the imaging control unit 5, the main control unit 12 controls the display control unit 6 to start the display start-up processing from the ending point of the imaging start-up processing thereof.

Thus, when the imaging start-up processing ends, the display control unit 6 uptakes the stipulated operation power from the power source block BTB, and starts operation. Subsequently, the display control unit 6 starts the display start-up processing in accordance with the corresponding boot program loaded to the program buffer 17.

At this time, the display control unit 6 first executes the display control unit boot processing similar to the above as the display start-up processing using the second operation clock according to the setting of the operation clock as to the control block 9.

Also, upon the display control unit boot processing ending, the display control unit 6 also executes display unit initialization processing using the second operation block according to the setting of the operation clock as to the control block 9. However, at this time the display control unit 6 executes only initialization of the display unit 21 at the display unit initialization processing, and prevents the backlight of this display unit 21 from being turned on.

Subsequently, upon the display start-up processing thus ending (i.e., upon the display unit initialization processing being completed), the display control unit 6 notifies the main control unit 12 via the bus 16 that this display start-up processing ends.

Upon the end of the display start-up processing being notified from the display control unit 6, the main control unit 12 controls the developing control unit 7 to start the developing start-up processing from the ending point of the display start-up processing.

Thus, when the display start-up processing ends, the developing control unit 7 uptakes the stipulated operation power from the power source block BTB, and starts operation. Subsequently, the developing control unit 7 starts the developing start-up processing in accordance with the corresponding boot program loaded to the program buffer 17.

At this time, the developing control unit 7 executes the developing control unit boot processing similar to the above as the developing start-up processing using the second operation clock according to the setting of the operation clock as to the control block 9. Note that, upon this developing start-up processing ending, the developing control unit 7 notifies the main control unit 12 via the bus 16 that this developing start-up processing ends.

Thus, when starting the discriminant origin start-up control processing still in a power-off state in preparation for input of a power on command, the main control unit 12 sequentially executes the imaging start-up processing, display start-up processing, and developing start-up processing while executing the saving start-up processing.

However, even in the event that the main control unit 12 determines based on the acceleration and angular velocity generated at the digital still camera 1 that the particular movement of this digital still camera 1 has been detected, the movement thereof may differ from the movement for photography shooting, and a power on command may not be input immediately.

That is to say, when the digital still camera 1 is moved to be put in a pocket of clothing or a bag, when the digital still camera 1 is moved by the user so as to be given to somebody else, or the like, the main control unit 12 may determine that the particular movement of this digital still camera 1 has been detected.

The battery of the power source block BTB has a nature such that, in general, the greater the power (current) to be supplied at once due to power (current) to be supplied to each circuit block at a time increasing, to execute parallel processing or the like, the sooner the remaining battery amount is depleted.

Accordingly, at this time, the main control unit 12 starts the imaging start-up processing for enabling photography shooting of a subject almost simultaneously along with the saving start-up processing having the longest processing time, but sequentially executes the display start-up processing and the developing start-up processing subsequent to the imaging start-up processing.

Thus, when determining that the particular movement of the digital still camera 1 has been detected, the main control unit 12 executes the imaging start-up processing, display start-up processing, developing start-up processing, and saving start-up processing, unknown to the user, but suppresses depletion of remaining battery amount due to execution thereof as much as possible.

Also, at this time, the main control unit 12 executes each piece of the imaging start-up processing, display start-up processing, developing start-up processing, and saving start-up processing using the second operation clock.

Accordingly, the main control unit 12 decreases the power (current) to be supplied from the power source block BTB to the imaging control unit 5, display control unit 6, developing control unit 7, and saving control unit 8 as compared to a case where the input origin start-up control processing is executed.

Thus, when determining that the particular movement of the digital still camera 1 has been detected, and executing the imaging start-up processing, display start-up processing, developing start-up processing, and saving start-up processing, the main control unit 12 further suppresses depletion of remaining battery amount by decreasing consumption power.

Further, upon the saving start-up processing ending, the saving control unit 8 notifies the main control unit 12 via the bus 16 that this saving start-up processing ends. Thus, the main control unit 12 detects the end of the saving start-up processing that ends latest of the imaging start-up processing, display start-up processing, developing start-up processing, and saving start-up processing, by notification from the saving control unit 8.

Upon detecting the end of the saving start-up processing, the main control unit 12 starts counting of predetermined waiting time selected beforehand by an internal timer, from the time of the end of this saving start-up processing.

Even in the event of exceeding the waiting time thereof, upon a power on command being not input via the operating unit 13 by the user, the main control unit 12 stops all of the operations of the imaging control unit 5, display control unit 6, developing control unit 7, and saving control unit 8, and ends the discriminant origin start-up control processing.

Thus, even in the event of determining that the particular movement of the digital still camera 1 has been detected, and executing the discriminant origin start-up control processing, in the case that the movement thereof differs from the movement for photography shooting, the main control unit 12 prevents the remaining battery amount from decreasing wastefully.

Incidentally, upon the imaging start-up processing ending, the imaging control unit 5 reads out the imaging control program from the ROM 15 to the program buffer 17 via the bus 16 in the same way as described above. Subsequently, the imaging control unit 5 controls the imaging processing block 20 to execute the moving image imaging processing in accordance with the imaging control program loaded to the program buffer 17.

However, at this time, the imaging control unit 5 controls the imaging processing block 20 to execute the moving image imaging processing using the second operation block so as to synchronize with the control of the self unit in accordance with the setting of the operation clock as to the control block 9.

Thus, upon the imaging start-up processing ending, the imaging processing block 20 executes the same moving image imaging processing as described above using the second operation clock even while executing the discriminant origin start-up control processing.

Thus, the imaging processing block 20 sequentially images a subject for moving image shooting at a longer predetermined cycle than the case of the first operation clock to generate moving image imaging data and temporarily stores this in the imaging buffer 30.

Also, upon the display start-up processing ending, the display control unit 6 reads out the display processing program from the ROM 15 to the program buffer 17 in the same way as described above. Subsequently, the display control unit 6 sequentially executes the same moving image display processing as described above using the second operation clock according to the setting of the operation clock as to the control block 9 in accordance with the display processing program.

At this time, the display control unit 6 starts the moving image display processing after only the processing time of the display start-up processing from the start point of the moving image imaging processing by the imaging processing block 20. Accordingly, when the moving image display processing is started, multiple pieces of moving image imaging data may already temporarily be stored in the imaging buffer 30.

Thus, upon starting the moving image display processing, the display control unit 6 reads out the moving image imaging data finally temporarily stored from the imaging buffer 30, generates the first unit image data based on the readout moving image imaging data, and transmits this to the display unit 21.

Subsequently, each time the display control unit 6 executes the moving image display processing, the display control unit 6 sequentially generates unit image data so as to read out sequentially newly temporarily stored moving image imaging data from the imaging buffer 30, and transmits this to the display unit 21.

Thus, the display control unit 6 does not generate late a moving image representing the past imaging state rather than the current subject imaging state, but generates a moving image representing the current subject imaging state in sync with imaging of this subject.

That is to say, when starting the moving image display processing, each time a subject is imaged for moving image shooting to generate moving image imaging date, the display control unit 6 synchronizes the moving image display processing with the moving image imaging processing so as to generate unit image data based on this generated moving image imaging data.

However, the display control unit 6 prevents the backlight of the display unit 21 from being turned on at the display unit initialization processing as described above. Accordingly, upon the display start-up processing ending, the display control unit 6 sequentially generates unit image data, and controls the display unit 21 for moving image display based on this generated unit image data, but prevents a moving image from being viewed on the display unit 21. That is to say, the display control unit 6 executes the moving image display processing still in a power-off state (i.e., while externally appearing that the digital still camera 1 has completely stopped its operation).

Also, of the circuit blocks and electric parts of the digital still camera 1, the backlight of the display unit 21 is an electric part of which the consumption power is relatively great. Accordingly, at this time, the main control unit 12 not only pretends as to the user that the operation is completely stopped, but also decreases the consumption power of the whole discriminant origin start-up control processing to further suppress depletion of the remaining battery amount.

Incidentally, upon starting the discriminant origin start-up control processing, the main control unit 12 executes the device start-up processing (imaging start-up processing, display start-up processing, developing start-up processing, saving start-up processing, or the like) at relatively slow processing speed (using the second operation clock) such as described above.

However, upon a power on command being input by the time the processing time exceeds the waiting time from the starting point of the discriminant origin start-up control processing, the main control unit 12 modifies the control method of the imaging control unit 5, display control unit 6, developing control unit 7, and saving control unit 8 according to the main control program, and executes the discriminant origin start-up control processing.

Note that, in the following description, the discriminant origin start-up control processing to be executed by modifying the control method of the imaging control unit 5, display control unit 6, developing control unit 7, and saving control unit 8 from the input point of a power on command will particularly be referred to as modification start-up control processing.

Upon starting the modification start-up control processing at the input point of a power on command, the main control unit 12 causes the imaging control unit 5, display control unit 6, developing control unit 7, and saving control unit 8 to execute the remaining of the device start-up processing using a second processing method whereby the processing time can be reduced as compared to the first processing mode.

That is to say, the main control unit 12 increases the processing speed using the second processing method from the input point of a power on command, and causes the imaging control unit 5, display control unit 6, developing control unit 7, and saving control unit 8 to execute the remaining of the device start-up processing.

Thus, even after starting the discriminant origin start-up control processing, upon a power on command being input, the main control unit 12 increases the processing speed of the device start-up processing from the input point thereof.

Figure 4:
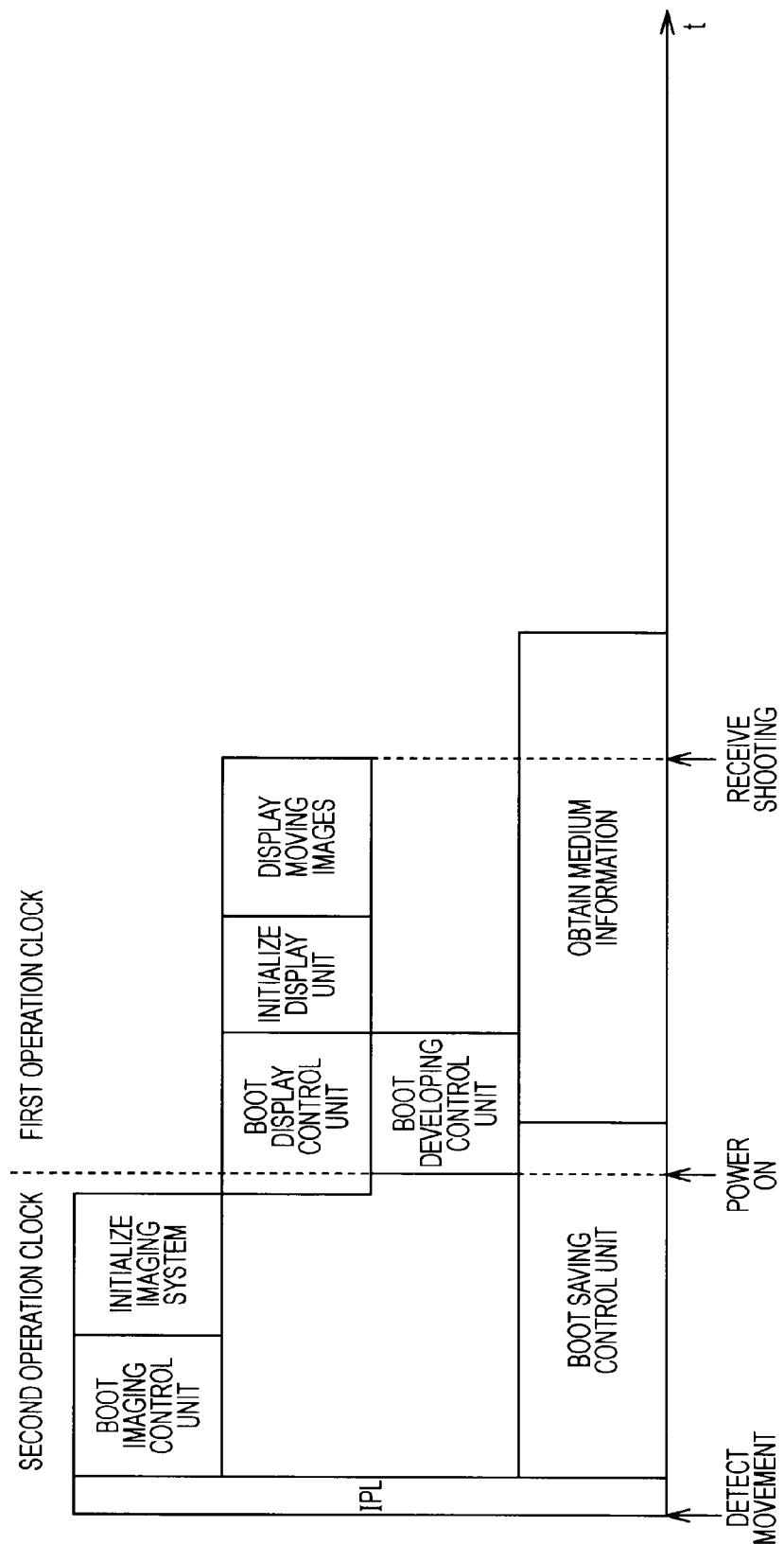
FIG. 4 is a schematic line drawing for describing another discriminant origin start-up control processing.

Such as shown in FIG. 4, actually, with the discriminant origin start-up control processing, for example, upon a power on command being input while executing the display start-up processing, the main control unit 12 switches the operation clock of the control block 9 from the second operation clock to the first operation clock.

Thus, the display control unit 6 executes the display start-up processing that has been executed with the second operation clock, using the first operation clock according to the setting switch of the operation clock as to the control block 9 from the input point of the power on command (i.e., from the middle).

Also, the saving control unit 8 also executes the saving start-up processing that has been executed using the second operation clock, using the first operation clock according to the setting switch of the operation clock as to the control block 9 from the input point of the power on command (i.e., from the middle).

Further, at this time, the main control unit 12 controls the developing control unit 7 to immediately start developing start-up processing scheduled to be executed from the ending point of the display start-up processing.

Thus, the developing control unit 7 starts the developing start-up processing using the first operation clock when a power on command is input without awaiting the end of the display start-up processing.

Thus, with the discriminant origin start-up control processing, even while executing each process serving as device start-up processing by decreasing the processing speed using the second operation clock, the main control unit 12 executes the remaining processes in parallel by increasing the processing speed using the first operation clock from the input point of the power on command.

Accordingly, even in the event of starting the discriminant origin start-up control processing, and executing the device start-up processing by decreasing the processing speed, the main control unit 12 can end the device start-up processing thereof as quickly as possible (in this case, the ending point of the saving start-up processing) from the input point of the power on command.

Also, in the case of executing the display start-up processing by switching from the second operation clock to the first operation clock in the middle thereof, the display control unit 6 turns on the backlight at the display unit initialization processing serving as the display start-up processing thereof.

Thus, upon the display start-up processing ending, the display control unit 6 executes the moving image display processing using the first operation clock subsequently in the same was as described above, but can clearly show the moving image displayed on the display unit 21 using the backlight.

Subsequently, upon executing the moving image display processing to start display of moving images on the display unit 21, the display control unit 6 notifies the main control unit 12 of display start of moving images in the same way as described above.

Upon display start of moving images being notified from the display control unit 6, the main control unit 12 starts reception of input of an imaging command by the operation of the release key in the same way as described above to enable photography shooting of a subject.

Also, the imaging control unit 5 controls the imaging processing block 20 using the second operation clock until a power on command is input. Subsequently, when a power on command is input, the imaging control unit 5 starts to control the imaging processing block 20 using the first operation clock according to the setting switch of the operation clock as to the control block 9.

That is to say, the imaging control unit 5 executes the moving image imaging processing, which is executed using the second operation clock by the imaging processing block 20 until a power on command is input, using the first operation clock so as to synchronize with the control of itself from the input point of a power on command.

Further, even in the event that the moving image imaging processing is thus executed by increasing the processing speed in the middle thereof by the imaging processing block 20, the display control unit 6 starts the moving image display processing with delay of only the processing time of the display start-up processing from the starting point of the moving image imaging processing.

Therefore, in such a case as well, in the same way as the above case, at the time of the moving image display processing being started, multiple pieces of moving image imaging data may be already temporarily stored in the imaging buffer 30.

Thus, in this case as well, the display control unit 6 executes the moving image display processing in sync with the moving image imaging processing in the same way as described above, and consequently, can display a moving image representing the current imaging state of a subject on the display unit 21.

Thus, the display control unit 6 can notify the user that photography shooting is available while allowing the user to confirm the current imaging state of a subject in real time by the moving image displayed on the display unit 21.

Note that, at this time, upon the developing start-up processing started using the first operation clock ending, the developing control unit 7 reads out a developing processing program from the ROM 15 to the program buffer 17 in the same way as described above. Subsequently, the developing control unit 7 executes developing processing using the first operation clock in the same way as described above in accordance with the developing processing program thereof as appropriate.

On the other hand, upon the saving start-up processing executed using the first operation clock in the middle thereof ending, the saving control unit 8 also reads out a saving processing program from the ROM 15 to the program buffer 17 in the same way as described above. Subsequently, the saving control unit 8 executes saving processing using the first operation clock in the same way as described above in accordance with the saving processing program thereof as appropriate.

Figure 5:
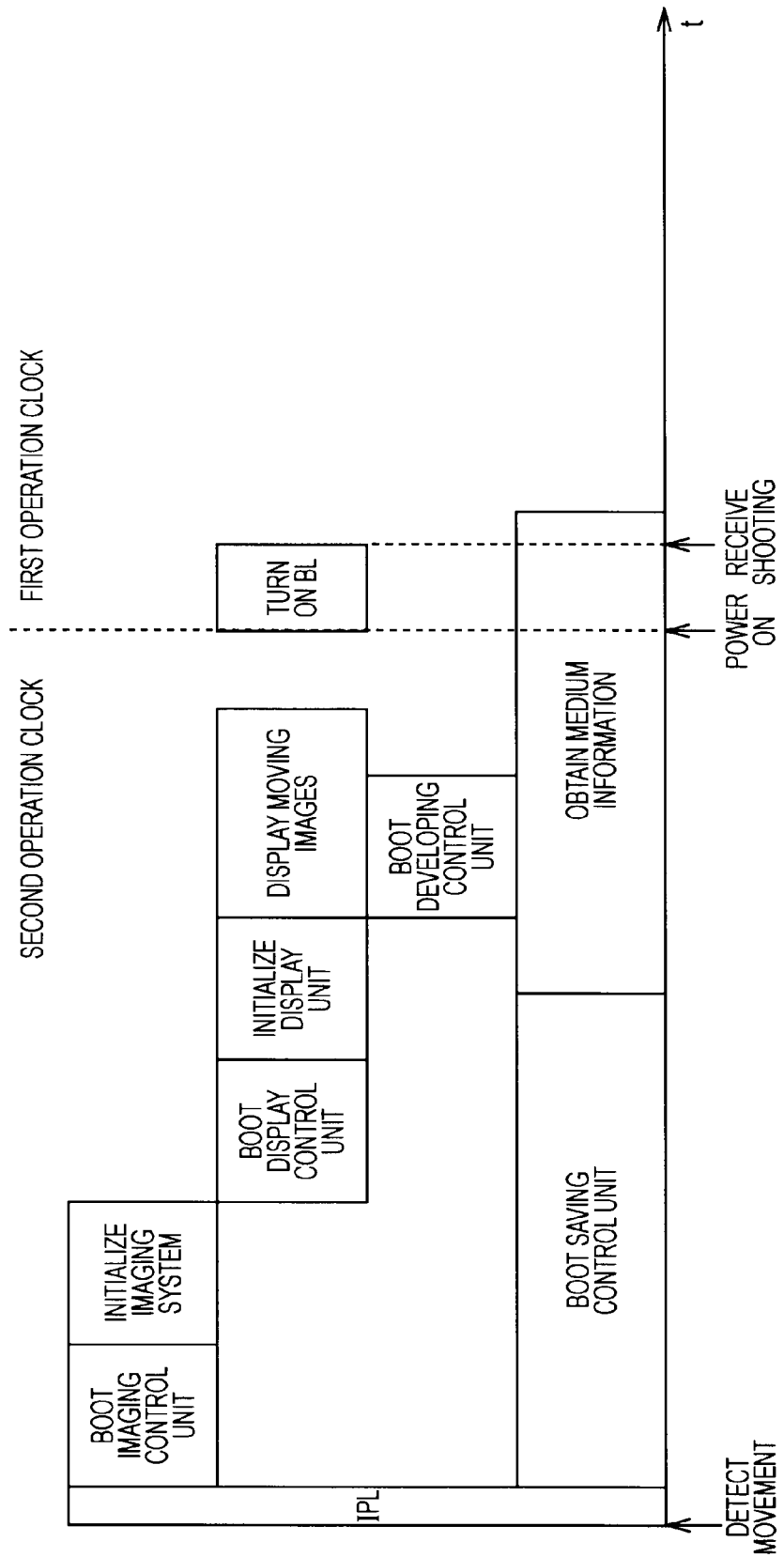
FIG. 5 is a schematic line drawing for describing yet another discriminant origin start-up control processing.

Also, such as shown in FIG. 5, with the discriminant origin start-up control processing, for example, upon a power on command being input while executing the developing start-up processing, in this case as well, the main control unit 12 switches and sets the operation clock of the control block 9 from the second operation clock to the first operation clock.

Thus, the developing control unit 7 executes the developing start-up processing, which has been executed with the second operation clock, using the first operation clock according to the setting switch of the operation clock as to the control block 9 from the input point of the power on command (i.e., from the middle).

Also, the saving control unit 8 also executes the saving start-up processing, which has been executed using the second operation clock, using the first operation clock according to the setting switch of the operation clock as to the control block 9 from the input point of the power on command (i.e., from the middle).

Thus, the main control unit 12 executes the developing start-up processing and the saving start-up processing, which have been executed by decreasing the processing speed using the second operation clock, using the first operation clock to increase the processing speed from the input point of the power on command.

Accordingly, upon a power on command being input while executing the developing start-up processing, the main control unit 12 can end the device start-up processing at earlier time than in the above case (in this case also, the ending point of the saving start-up processing) from the input point thereof.

Incidentally, in this case also, the imaging control unit 5 controls the imaging processing block 20 using the second operation clock until a power on command is input, thereby causing this imaging processing block 20 to execute the moving image imaging processing using the second operation clock.

Also, when starting the moving image display processing using the second operation clock, the display control unit 6 synchronizes this moving image display processing with the moving image imaging processing in the same way as described above.

Subsequently, the imaging control unit 5 executes the moving image imaging processing, which has been executed by the imaging processing block 20 using the second operation clock until a power on command is input, using the first operation clock so as to synchronize with the control of itself from the input point of the power on command in the same way as described above.

Also, when a power on command is input, the display control unit 6 also executes the moving image display processing, which has been executed so far using the second operation clock, using the first operation clock according to the setting switch of the operation clock as to the control block 9.

Therefore, when a power on command is input, the display control unit 6 can continuously execute, without executing certain processing so as to synchronize the moving image display processing with the moving image imaging processing again, this moving image display processing while being synchronized with the moving image imaging processing.

Further, when a power on command is input, the main control unit 12 controls the display control unit 6 to turn on the backlight of the display unit 21. Accordingly, when a power on command is input, the display control unit 6 starts supply of power for turning on the backlight of the display unit 21 in addition to switching of the operation clock.

Thus, the display control unit 6 boots the backlight for lighting in merely slight time from the input point of the power on command, and turns on this with the stipulated luminance. Therefore, after input of the power on command, the display control unit 6 can clearly show a moving image on the display unit 21.

Upon thus starting display of moving images on the display unit 21 (i.e., upon turning on the backlight with start-up stipulated luminance), in this case also, in the same way as described above, the display control unit 6 notifies the main control unit 12 of display start of moving images.

Accordingly, upon display start of moving images being notified from the display control unit 6, the main control unit 12 starts reception of input of an imaging command by the operation of the release key in the same way as described above, and enables photography shooting of a subject.

Note that, at this time, upon the developing start-up processing executed using the first operation clock from the middle thereof ending, the developing control unit 7 reads out the developing processing program from the ROM 15 to the program buffer 17 in the same way as described above. Subsequently, the developing control unit 7 executes the developing processing using the first operation clock in the same way as described above in accordance with the developing processing program thereof as appropriate.

On the other hand, upon the saving start-up processing executed with the first operation clock from the middle thereof ending, the saving control unit 8 also reads out the saving processing program from the ROM 15 to the program buffer 17 in the same way as described above. Subsequently, the saving control unit 8 executes the saving processing using the first operation clock in the same way as described above in accordance with the saving processing program thereof as appropriate.

Figure 6:
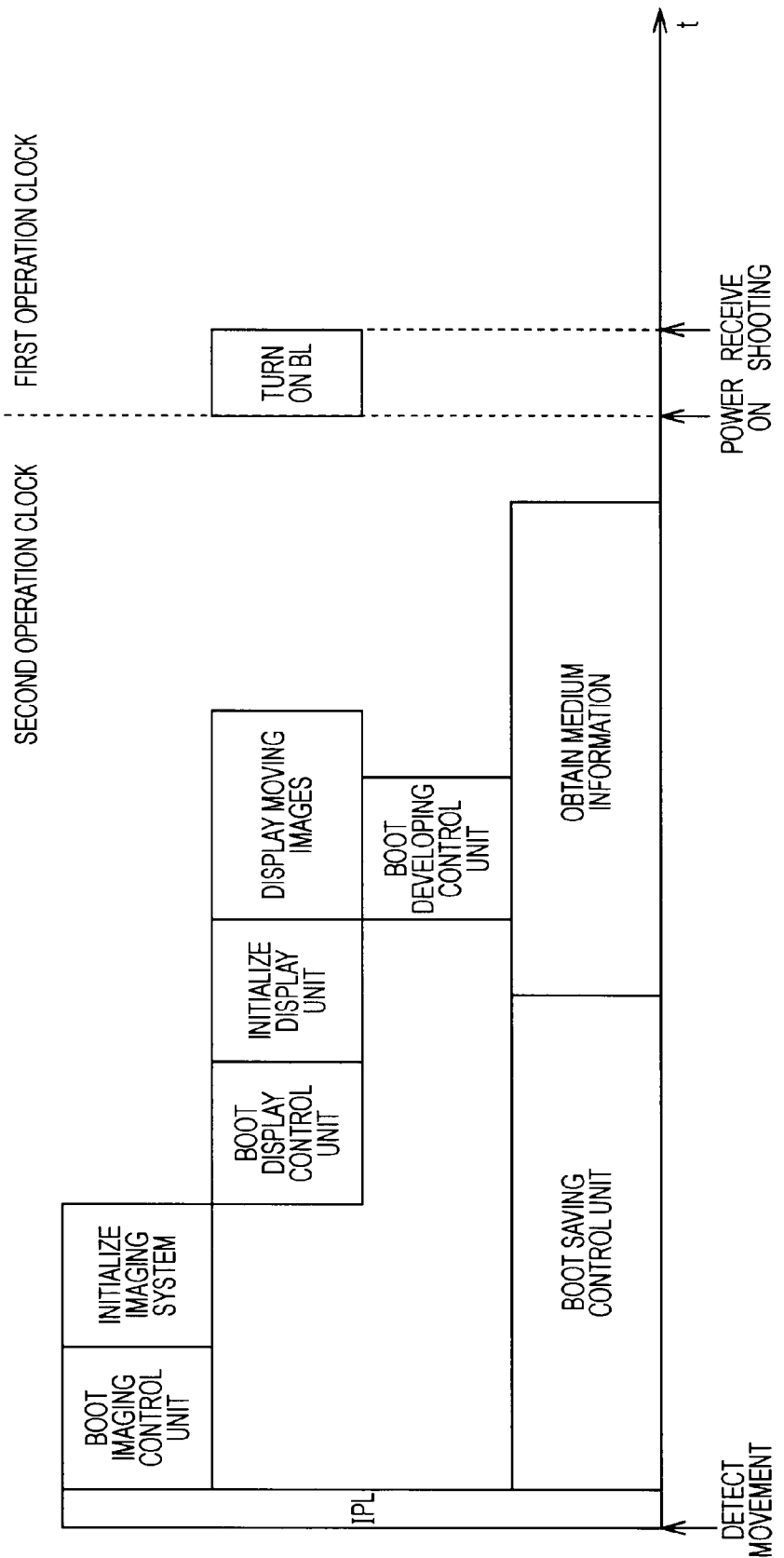
FIG. 6 is a schematic line drawing for describing yet another discriminant origin start-up control processing.

Further, such as shown in FIG. 6, with the discriminant origin start-up control processing, upon a power on command being input before exceeding waiting time even after the saving start-up processing ends, at this time the main control unit 12 also starts the modification start-up control processing. At this time, the main control unit 12 switches and sets the operation clock of the control block 9 from the second operation clock to the first operation clock.

Thus, in this case also, the imaging control unit 5 executes the moving image imaging processing, which has been executed with the second operation clock by the imaging processing block 20, using the first operation clock according to the setting switch of the operation clock as to the control block 9 from the input point of the power on command.

Also, the display control unit 6 also executes the moving image display processing, which has been executed with the second operation clock, using the first operation clock according to the setting switch of the operation clock as to the control block 9 from the input point of the power on command.

Further, thus, when a power on command is input, the main control unit 12 controls the display control unit 6 to turn on the backlight of the display unit 21. Accordingly, when a power on command is input, the display control unit 6 turns on the backlight of the display unit 21 and start display of moving images in the same way as described above in addition to switching of the operation clock.

Upon thus starting display of moving images on the display unit 21, the display control unit 6 notifies the main control unit 12 of display start of moving images in the same way as described above. Thus, the main control unit 12 starts reception of input of an imaging command by the operation of the release key in the same way as described above according to the notification from the display control unit 6 to enable photography shooting of a subject.

Note that, in this case, a power on command is input after the saving start-up processing ends, and accordingly, the main control unit 12 ends the discriminant origin start-up control processing at the time of enabling photography shooting according to display start of moving images on the display unit 21.

Also, at this time, upon a power on command being input and the processing being executable with the first operation clock, the developing control unit 7 reads out the developing processing program from the ROM 15 to the program buffer 17 in the same way as described above. Subsequently, the developing control unit 7 executes the developing processing using the first operation clock in the same way as described above in accordance with the developing processing program thereof, as appropriate.

Further, at this time, upon a power on command being input and the processing being executable with the first operation clock, the saving control unit 8 also reads out the saving processing program from the ROM 15 to the program buffer 17 in the same way as described above. Subsequently, the saving control unit 8 executes the saving processing using the first operation clock in the same way as described above in accordance with the saving processing program thereof, as appropriate.

Thus, upon a power on command being input while executing the discriminant origin start-up control processing, the main control unit 12 can shorten time from input of the power on command until photography shooting is enabled.

That is to say, upon a power on command being input while executing the imaging start-up processing, the main control unit 12 sequentially causes the display control unit 6 to execute the display start-up processing and the moving image display processing using the first operation clock from the input point thereof, and upon display of moving images on the display unit 21 being started, enables photography shooting.

However, in this case, the main control unit 12 completes readout of each boot program from the ROM 15 to the program buffer 17 before a power on command is input.

Accordingly, in this case, the main control unit 12 can shorten time from input of a power on command until photography shooting is enabled by the processing time used for readout of each boot program as compared to the input origin start-up control processing. Note that, in the following description, processing time used for readout of each boot program from the ROM 15 to the program buffer 17 will be referred to as program readout processing time.

Also, upon a power on command being input while executing the display start-up processing, the main control unit 12 causes the display control unit 6 to execute the display start-up processing using the first operation clock, and subsequently, to execute the moving image display processing using the first operation clock, and upon display of moving images being started, enables photography shooting.

Accordingly, in this case, the main control unit 12 can shorten time from input of a power on command until photography shooting is enabled by the processing time used for a portion of which the display start-up processing has already ended along with the program readout processing time as compared to the input origin start-up control processing.

Further, upon a power on command being input while executing the developing start-up processing, and the first moving image display processing for generating the first unit image data, the main control unit 12 causes the display control unit 6 to execute the moving image display processing using the first operation clock from the input point thereof to start display of moving images.

Accordingly, in this case, the main control unit 12 can suppress time from input of a power on command until photography shooting is enabled to only the processing time used for a portion executed with the first operation clock with the first moving image display processing.

Further, though the first moving image display processing ends, upon a power on command being input while executing the developing start-up processing and the saving start-up processing, the main control unit 12 turns on the backlight to enable photography shooting.

Therefore, in this case, the main control unit 12 can suppress time from input of a power on command until photography shooting is enabled to only the time used for turning on the backlight (i.e., time used from start of power supply to the backlight until the backlight is turned on with the stipulated luminance).

Further, upon a power on command being input after the saving start-up processing has already ended, in this case also, the main control unit 12 turns on the backlight to enable photography shooting.

Accordingly, in this case also, the main control unit 12 can suppress time from input of a power on command until photography shooting is enabled to only the time used for turning on the backlight.

Thus, when a power on command is input while executing the discriminant origin start-up control processing, the main control unit 12 causes the imaging control unit 5, display control unit 6, developing control unit 7, and saving control unit 8 to execute various types of processing in parallel.

Also, when photography imaging data is generated by the imaging processing block 20, the main control unit 12 temporarily stores this generated photography imaging data in the imaging buffer 30. Further, when compressed photograph image data is generated by the developing control unit 7, the main control unit 12 temporarily stores this generated compressed photograph image data in the image buffer 31.

Accordingly, with this discriminant origin start-up control processing as well, the main control unit 12 enables photography shooting of a subject at a point as quick as possible from input of a power on command, and also after enabling this photography shooting, can continuously perform photography shooting of a subject.

1-3. Camera Start-Up Control Processing Procedure by Main Control Unit

Next, description will be made regarding camera start-up control processing procedures RT1 that the main control unit 12 executes at the time of booting the digital still camera 1, with reference to FIG. 7 through FIG. 11.

Figure 7:
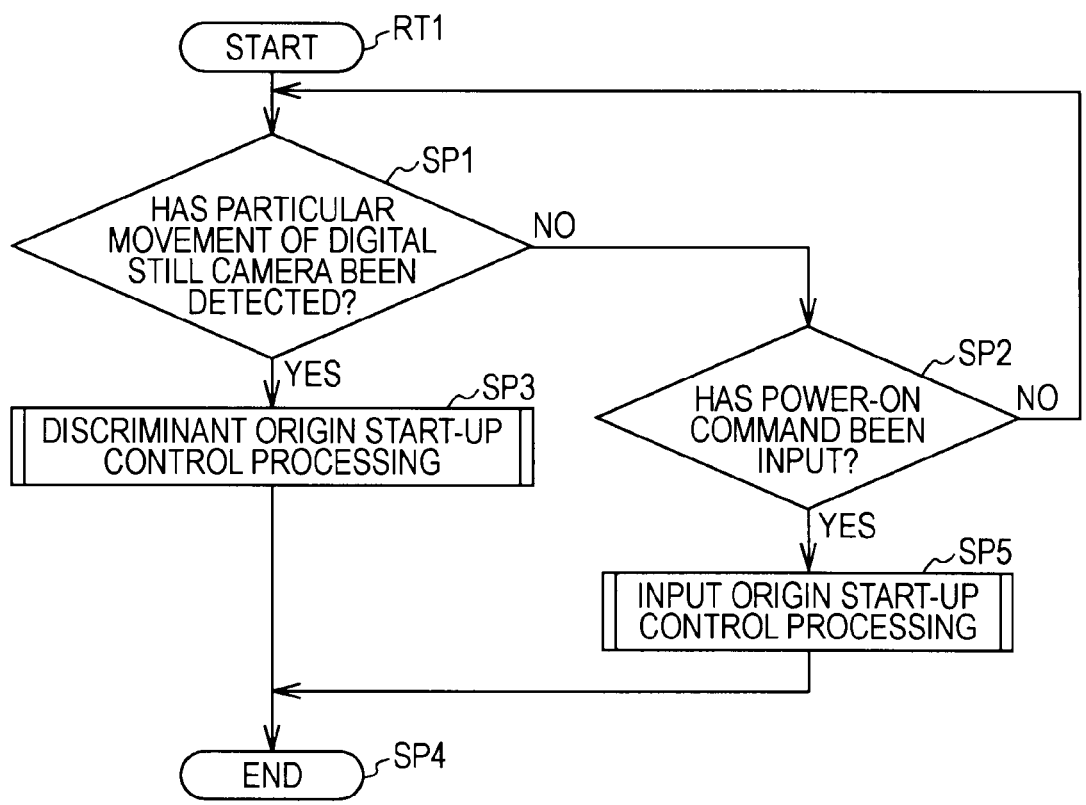
FIG. 7 is a flowchart illustrating camera start-up control processing procedures.

For example, upon a power off command being input via the operating unit 13 by the user, the main control unit 12 starts the camera start-up control processing procedures RT1 shown in FIG. 7 in accordance with the internal main control program.

Upon starting the camera start-up control processing procedures RT1, in step SP1 the main control unit 12 determines whether or not the particular movement of the digital still camera 1 has been detected by the movement detecting unit 11.

Upon a negative result being obtained in step SP1, this means that, for example, the digital still camera 1 is now being carried by the user. Upon obtaining such a negative result in step SP1, the main control unit 12 proceeds to step SP2.

In step SP2, the main control unit 12 determines whether or not a power on command has been input via the operating unit 13 by the user. Upon a negative result being obtained in step SP2, this means, for example, that the digital still camera 1 is now carried by the user. Accordingly, upon obtaining such a negative result in step SP2, the main control unit 12 returns to step SP1.

Thus, subsequently, the main control unit 12 repeatedly executes the processing in step SP1 and step SP2 cyclically until a positive result is obtained in step SP1 or step SP2.

Accordingly, the main control unit 12 awaits input of a power on command, for example, by the digital still camera 1 being moved for photography shooting by the user according to a photograph opportunity occurring, or by the digital still camera 1 being already pointed toward a subject.

Subsequently, upon obtaining a positive result in step SP1, this means that determination may be made by the user that a photograph opportunity has occurred, and the digital still camera 1 is moved for photography shooting of a subject (i.e., the particular movement has been detected). Accordingly, upon obtaining this positive result in step SP1, the main control unit 12 proceeds to the next step SP3.

In step SP3, the main control unit 12 executes the discriminant origin start-up control processing. Subsequently, upon the discriminant origin start-up control processing thereof ending, the main control unit 12 proceeds to the next step SP4, and ends the camera start-up control processing procedures RT1.

On the other hand, upon a positive result being obtained in step SP2, this means that determination is made that a photograph opportunity has occurred while the digital still camera 1 is already pointed toward a subject, and a power on command is input. Accordingly, upon obtaining such a positive result in step SP2, the main control unit 12 proceeds to the next step SP5.

In step SP5, the main control unit 12 executes the input origin start-up control processing. Subsequently, upon the input origin start-up control processing thereof ending, the main control unit 12 proceeds to the next step SP4, and ends the camera start-up control processing procedures RT1.

Figure 8:
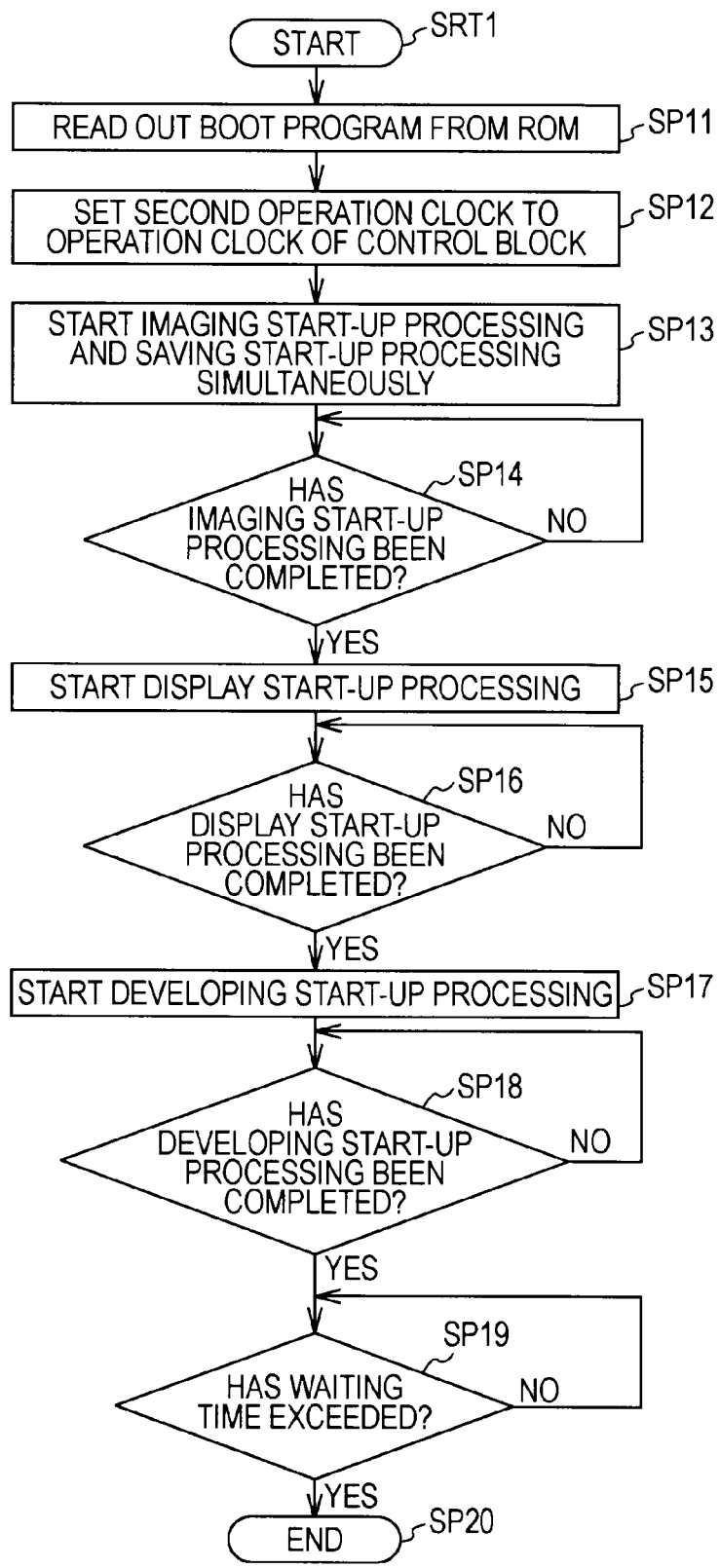
FIG. 8 is a flowchart illustrating discriminant origin start-up control processing procedures.

Incidentally, upon proceeding to step SP3 in the camera start-up control processing procedures RT1, the main control unit 12 starts discriminant origin start-up control processing procedures SRT1 shown in FIG. 8 in accordance with the internal main control program.

Upon starting the discriminant origin start-up control processing procedures SRT1, in step SP11 the main control unit 12 reads out the initial program from the ROM 15 to the program buffer 17. Subsequently, the main control unit 12 reads out the boot programs from the ROM 15 to the program buffer 17 in accordance with the initial program loaded to the program buffer 17 thereof, and proceeds to the next step SP12.

In step SP12, the main control unit 12 sets the operation clock at the time of executing various types of processing to the second operation clock as to the control block 9, and proceeds to the next step SP13.

In step SP13, the main control unit 12 controls the imaging control unit 5 and the saving control unit 8 to start the imaging start-up processing and the saving start-up processing simultaneously. Thus, the main control unit 12 causes the imaging control unit 5 and the saving control unit 8 to start the imaging start-up processing and the saving start-up processing generally at the same time, and proceeds to the next step SP14.

In step SP14, the main control unit 12 awaits for, of the imaging start-up processing and the saving start-up processing executed with the second operation clock, this imaging start-up processing to end. Subsequently, upon the imaging start-up processing ending, the main control unit 12 proceeds to the next step SP15.

In step SP15, the main control unit 12 controls the display control unit 6 to start the display start-up processing. Thus, the main control unit 12 causes the display control unit 6 to start the display start-up processing, and proceeds to the next step SP16.

In step SP16, the main control unit 12 awaits that the display start-up processing executed with the second operation clock ends. Subsequently, upon the display start-up processing ending, the main control unit 12 proceeds to the next step SP17.

In step SP17, the main control unit 12 controls the developing control unit 7 to start the developing start-up processing. Thus, the main control unit 12 causes the developing control unit 7 to start the developing start-up processing, and proceeds to the next step SP18.

In step SP18, the main control unit 12 awaits that, of the developing start-up processing and the saving start-up processing executed with the second operation clock, the saving start-up processing that will end later ends. Subsequently, upon the saving start-up processing ending, the main control unit 12 proceeds to the next step SP19.

In step SP19, the main control unit 12 starts counting by the internal timer, and awaits that the counted time of this timer exceeds the waiting time. Subsequently, upon the counted time of this timer exceeding the waiting time, the main control unit 12 proceeds to the next step SP20.

Thus, in step SP20, the main control unit 12 ends the discriminant origin start-up control processing procedures SRT1, and proceeds to the step SP4 of the above camera start-up control processing procedures RT1.

Incidentally, the main control unit 12 monitors whether or not a power on command has been input via the operating unit 13 by the user, while executing the discriminant origin start-up control processing procedures SRT1.

Subsequently, upon no power on command being input while executing the discriminant origin start-up control processing procedures SRT1, the main control unit 12 continuously executes the discriminant origin start-up control processing procedures SRT1, and finally ends this in step SP20.

However, upon a power on command being input while executing the discriminant origin start-up control processing procedures SRT1, the main control unit 12 interrupts the discriminant origin start-up control processing procedures SRT1 at the input point thereof.

Figure 9:
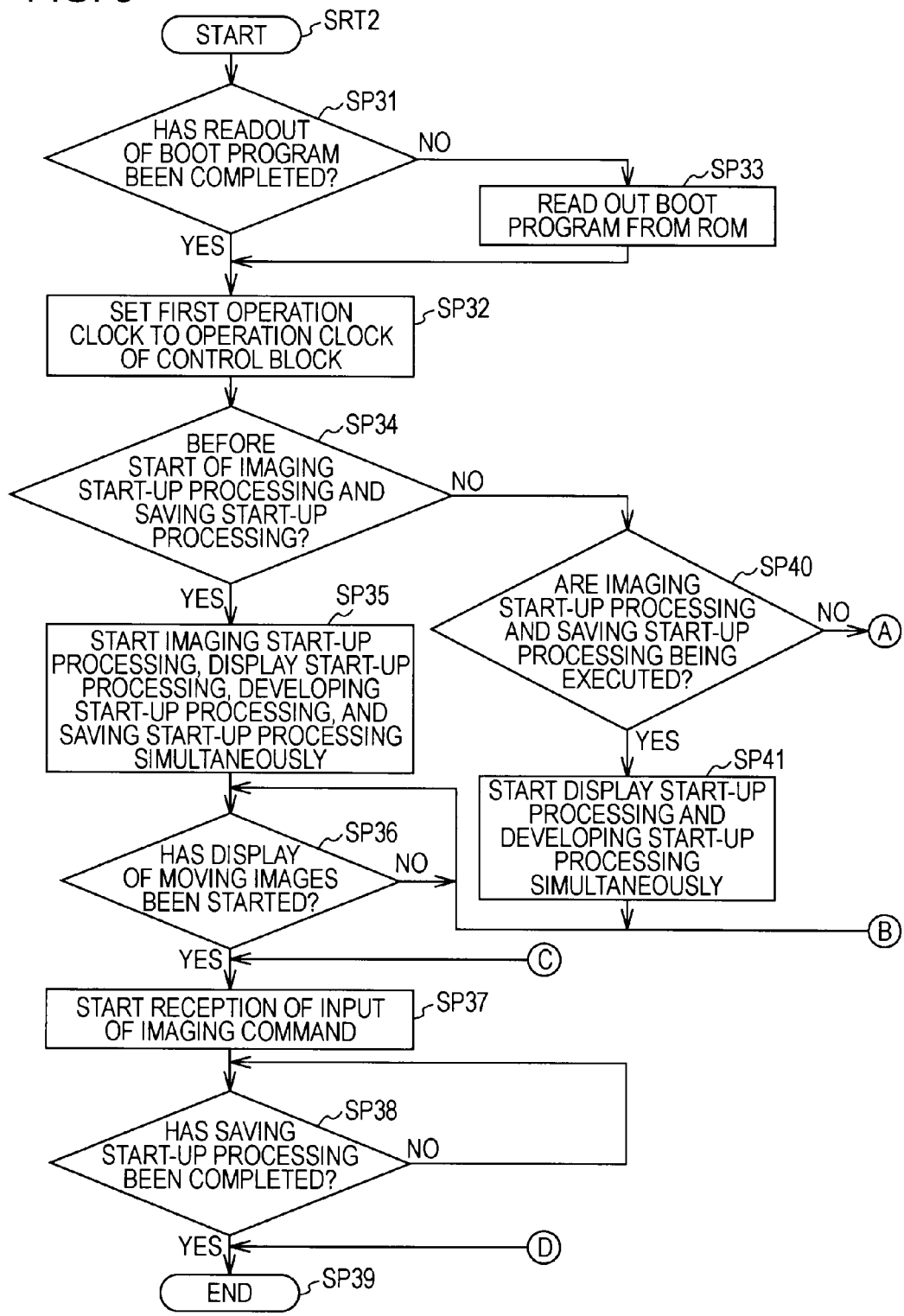
FIG. 9 is a flowchart illustrating modification start-up control processing procedures.
Figure 10:
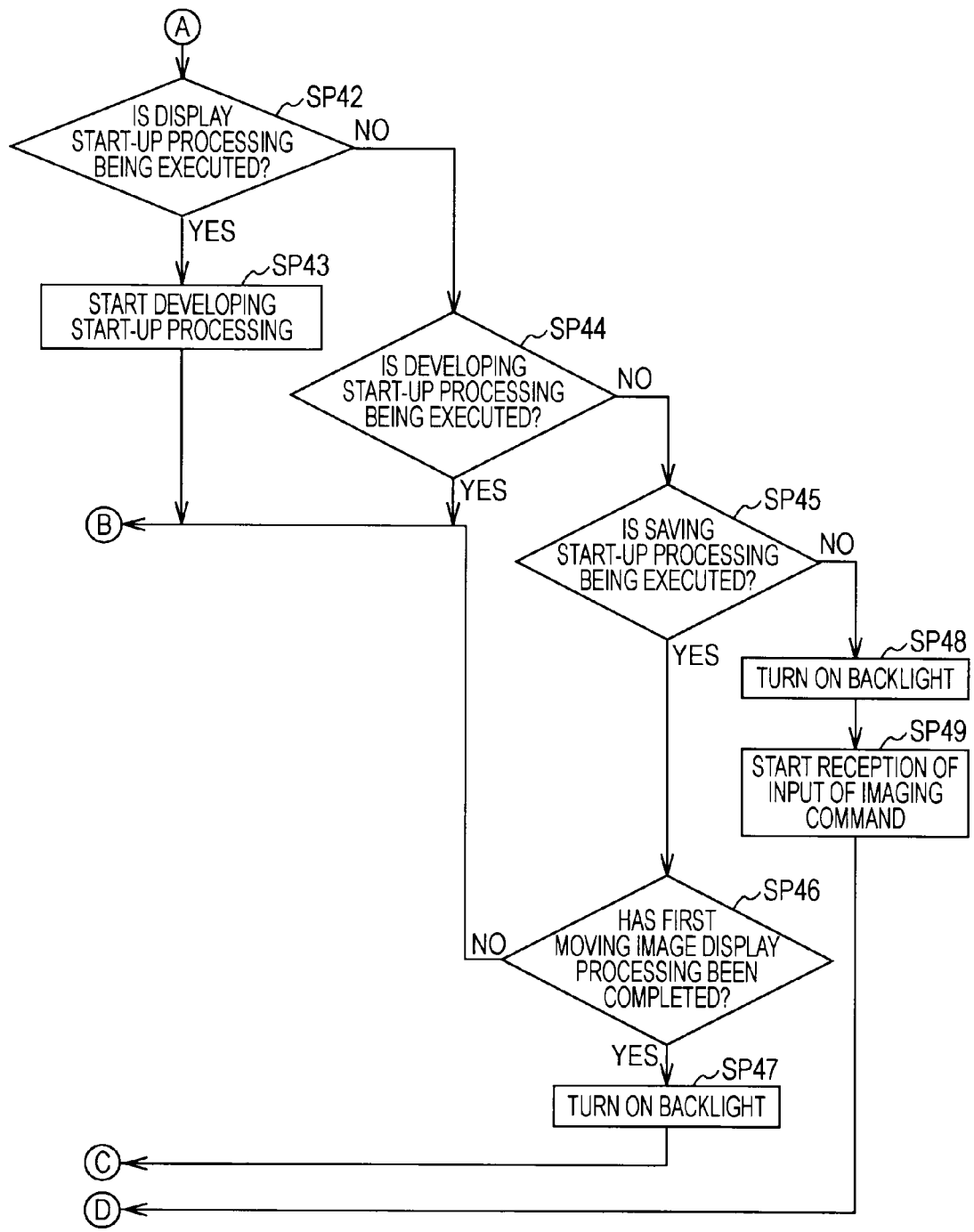
FIG. 10 is a flowchart illustrating another modification start-up control processing procedures.

Subsequently, the main control unit 12 starts modification start-up control processing procedures SRT2 shown in FIG. 9 and FIG. 10 in accordance with the main control program.

Upon starting the modification start-up control processing procedures SRT2 according to input of a power on command, in step SP31 the main control unit 12 determines whether or not readout of the boot program from the ROM 15 to the program buffer 17 has been completed.

Upon a positive result being obtained in step SP31, this means that after readout of the boot program from the ROM 15 to the program buffer 17 is completed, a power on command is input by the user. Upon such a positive result being obtained in step SP31, the main control unit 12 proceeds to the next step SP32.

On the other hand, upon a negative result being obtained in step SP31, this means that a power on command is input by the user while reading out the initial program or boot program from the ROM 15 to the program buffer 17. Upon such a negative result being obtained in step SP31, the main control unit 12 proceeds to step SP33.

Subsequently, in step SP33 the main control unit 12 reads out the boot program from the ROM 15 to the program buffer 17, or after reading out the initial program in the same way as with the above step SP11, reads out the boot program. Upon readout of the boot program from the ROM 15 to the program buffer 17 being completed, the main control unit 12 proceeds to step SP32.

In step SP32, the main control unit 12 sets the operation clock of the control block 9 to the first operation clock, and proceeds to the next step SP34. Alternatively, in step SP32 the main control unit 12 set the control block 9 to the first operation clock instead of the already set second operation clock. Thus, the main control unit 12 executes various types of processing executed with the second operation clock until a power on command is input, using the first operation clock instead of the second operation clock, and proceeds to the next step SP34.

In step SP34, the main control unit 12 determines whether or not a power on command has been input before starting the imaging start-up processing and the saving start-up processing. Upon obtaining a positive result in step SP34, this represents, for example, that a power on command is input by the user while setting the second operation clock as to the control block 9. Accordingly, upon obtaining such a positive result in step SP34, the main control unit 12 proceeds to the next step SP35.

In step SP35, the main control unit 12 controls the imaging control unit 5, display control unit 6, developing control unit 7, and saving control unit 8 to start the imaging start-up processing, display start-up processing, developing start-up processing, and saving start-up processing simultaneously.

Thus, the main control unit 12 causes the imaging control unit 5, display control unit 6, developing control unit 7, and saving control unit 8 to start the imaging start-up processing, display start-up processing, developing start-up processing, and saving start-up processing generally at the same time as the device start-up processing according to the second processing mode, and proceeds to the next step SP36.

In step SP36, the main control unit 12 awaits that display of moving images on the display unit 21 is started. Subsequently, upon display of moving images on the display unit 21 being started, the main control unit 12 proceeds to the next step SP37. Accordingly, in step SP37, the main control unit 12 starts reception of input of an imaging command to enable photography shooting, and proceeds to the next step SP38.

In step SP38, the main control unit 12 awaits that the saving start-up processing having the longest processing time, which is executed with the first operation clock, ends. Subsequently, upon the saving start-up processing ending, the main control unit 12 proceeds to the next step SP39.

Accordingly, in step SP39, the main control unit 12 ends the modification start-up control processing procedures SRT2, and proceeds to the step SP4 of the above camera start-up control processing procedures RT1.

Incidentally, upon a negative result being obtained in step SP34, this means that a power on command has been input by the user while executing the imaging start-up processing and the saving start-up processing using the second operation clock.

Also, such a negative result also represents that a power on command has been input by the user while executing the display start-up processing and the saving start-up processing using the second operation clock, or while executing the developing start-up processing and the saving start-up processing using the second operation clock.

Further, such a negative result also represents that a power on command has been input by the user while independently executing the saving start-up processing using the second operation block, or before exceeding the waiting time after the saving start-up processing has ended. Accordingly, upon obtaining such a negative result in step SP34, the main control unit 12 proceeds to step SP40.

In step SP40, the main control unit 12 determines whether or not the imaging start-up processing and the saving start-up processing are being executed. Upon a positive result being obtained in step SP40, this means that a power on command has been input by the user while executing the imaging start-up processing and the saving start-up processing using the second operation clock. Upon obtaining such a positive result in step SP40, the main control unit 12 proceeds to the next step SP41.

In step SP41, the main control unit 12 controls the display control unit 6 and the developing control unit 7 to start the display start-up processing and the developing start-up processing simultaneously. Thus, the main control unit 12 causes the display control unit 6 and the developing control unit 7 to start the display start-up processing and the developing start-up processing additionally generally at the same time while executing the imaging start-up processing and the saving start-up processing, and proceeds to step SP36.

Incidentally, upon a negative result being obtained in the above step SP40, this means that a power on command has been input by the user while executing the display start-up processing and the saving start-up processing using the second operation clock.

Also, such a negative result also represents that a power on command has been input by the user while executing the developing start-up processing and the saving start-up processing using the second operation clock.

Further, such a negative result also represents that a power on command has been input by the user while independently executing the saving start-up processing using the second operation block, or before exceeding the waiting time after the saving start-up processing has ended. Accordingly, upon obtaining such a negative result in step SP40, the main control unit 12 proceeds to step SP42.

In step SP42, the main control unit 12 determines whether or not the display start-up processing is being executed. Upon a positive result being obtained in step SP42, this means that a power on command has been input by the user while executing the display start-up processing using the second operation clock. Upon obtaining such a positive result in step SP42, the main control unit 12 proceeds to the next step SP43.

In step SP43, the main control unit 12 controls the developing control unit 7 to start the developing start-up processing. Thus, the main control unit 12 causes the developing control unit 7 to start the developing start-up processing additionally while executing the display start-up processing and the saving start-up processing, and proceeds to step SP36.

Incidentally, upon a negative result being obtained in the above step SP42, this means that a power on command has been input by the user while executing the developing start-up processing and the saving start-up processing using the second operation clock.

Also, such a negative result also represents that a power on command has been input by the user while independently executing the saving start-up processing using the second operation block, or before exceeding the waiting time after the saving start-up processing has ended. Accordingly, upon obtaining such a negative result in step SP42, the main control unit 12 proceeds to step SP44.

In step SP44, the main control unit 12 determines whether or not the developing start-up processing is being executed. Upon a positive result being obtained in step SP44, this means that a power on command has been input by the user while executing the developing start-up processing using the second operation clock. Upon obtaining such a positive result in step SP44, the main control unit 12 proceeds to step SP36.

Incidentally, upon a negative result being obtained in the above step SP44, this means that a power on command has been input by the user while independently executing the saving start-up processing using the second operation block, or before exceeding the waiting time after the saving start-up processing has ended. Accordingly, upon obtaining such a negative result in step SP44, the main control unit 12 proceeds to step SP45.

In step SP45, the main control unit 12 determines whether or not the saving start-up processing is independently being executed. Upon a positive result being obtained in step SP45, this means that a power on command has been input by the user while independently executing the saving start-up processing using the second operation clock. Upon obtaining such a positive result in step SP45, the main control unit 12 proceeds to the next step SP46.

In step SP46, the main control unit 12 determines whether or not the first moving image display processing has been executed by the display control unit 6, and has been already completed. Upon a negative result being obtained in step SP46, this means that a power on command has been input while executing the first moving image display processing using the second operation clock by the display control unit 6. Accordingly, upon obtaining such a negative result in step SP46, the main control unit 12 proceeds to step SP36.

On the other hand, upon a positive result being obtained in step SP46, this means that a power on command has been input by the user after the first moving image display processing executed by the display control unit 6 has ended. Accordingly, upon obtaining such a positive result in step SP46, the main control unit 12 proceeds to the next step SP47.

In step SP47, the main control unit 12 controls the display control unit 6 to turn on the backlight of the display unit 21, and upon this backlight being turned on, proceeds to step SP37.

Incidentally, upon a negative result being obtained in step SP45, this means that a power on command has been input by the user before exceeding the waiting time after the saving start-up processing has ended. Accordingly, upon obtaining such a negative result in step SP45, the main control unit 12 proceeds to step SP48.

In step SP48, the main control unit 12 controls the display control unit 6 to turn on the backlight of the display unit 21, and upon this backlight being turned on, proceeds to step SP49. Subsequently, in step SP49, the main control unit 12 starts reception of input of an imaging command to enable photograph shooting, and then proceeds to step SP39.

Thus, in step SP39 the main control unit 12 ends the modification start-up control processing procedures SRT2, and proceeds to the step SP4 of the above camera start-up control processing procedures RT1.

Figure 11:
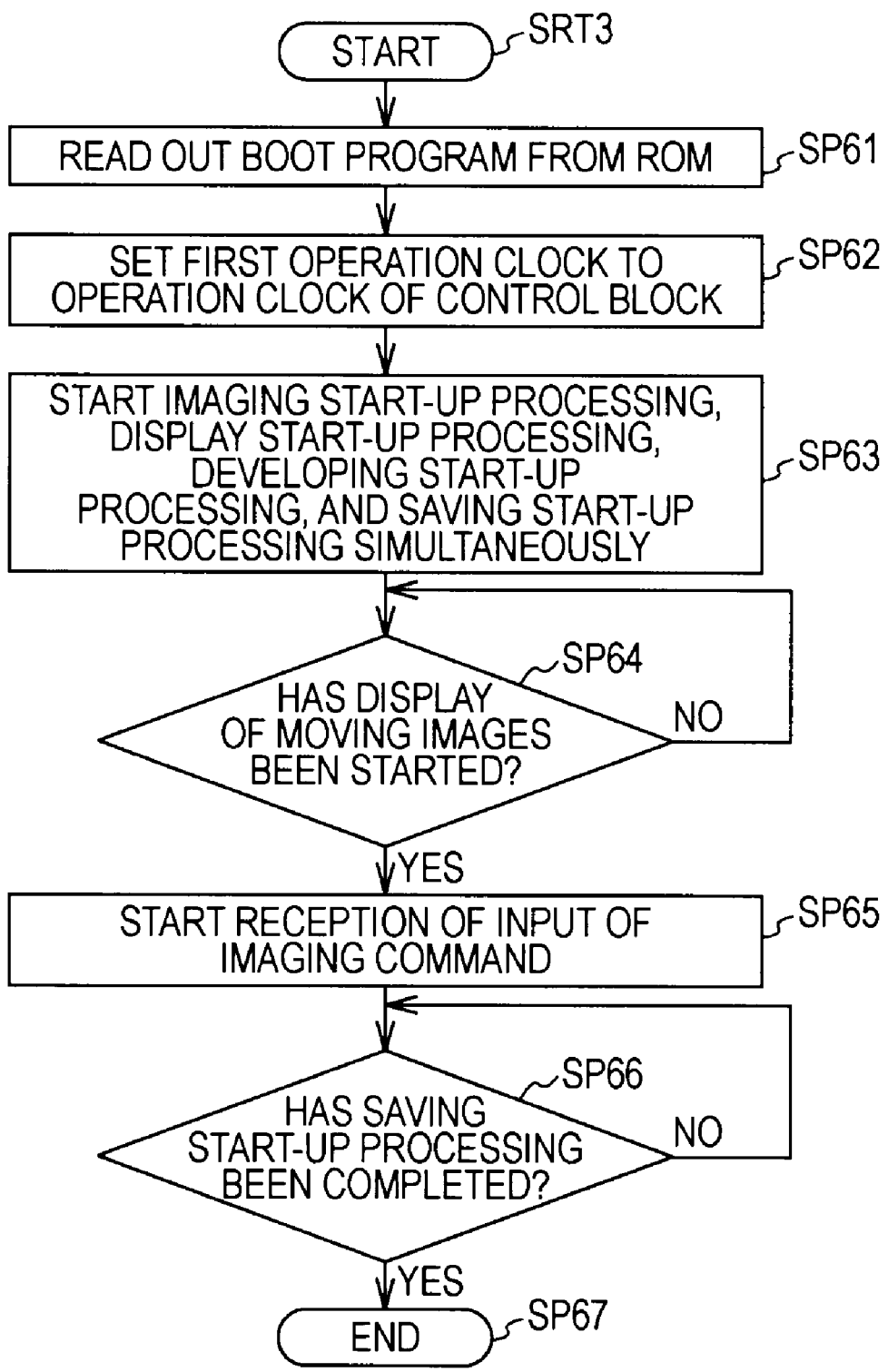
FIG. 11 is a flowchart illustrating input origin start-up control processing procedures.

On the other hand, upon proceeding to step SP5 in the camera start-up control processing procedures RT1, the main control unit 12 starts input origin start-up control processing procedures SRT3 shown in FIG. 11 in accordance with the internal main control program.

Upon starting the input origin start-up control processing procedures SRT3, in step SP61 the main control unit 12 reads out the initial program from the ROM 15 to the program buffer 17. Subsequently, the main control unit 12 reads out each boot program from the ROM 15 to the program buffer 17 in accordance with the initial program thereof loaded to the program buffer 17, and proceeds to the next step SP62.

In step SP62, the main control unit 12 sets the operation clock at the time of executing various types of processing for the control block 9 to the first operation clock, and proceeds to the next step SP63.

In step SP63, the main control unit 12 controls the imaging control unit 5, display control unit 6, developing control unit 7, and saving control unit 8 to start the imaging start-up processing, display start-up processing, developing start-up processing, and saving start-up processing simultaneously.

Thus, the main control unit 12 controls the imaging control unit 5, display control unit 6, developing control unit 7, and saving control unit 8 to start the imaging start-up processing, display start-up processing, developing start-up processing, and saving start-up processing generally at the same time as the device start-up processing, and proceeds to the next step SP64.

In step SP64, the main control unit 12 awaits that display of moving images on the display unit 21 is started. Subsequently, upon display of moving images on the display unit 21 being started, the main control unit 12 proceeds to the next step SP65. Accordingly, in step SP65 the main control unit 12 starts reception of input of an imaging command to enable photography shooting, and proceeds to the next step SP66.

In step SP66, the main control unit 12 awaits that the saving start-up processing having the longest processing time ends. Subsequently, upon the saving start-up processing ending, the main control unit 12 proceeds to the next step SP67.

Accordingly, in step SP67 the main control unit 12 ends the input origin start-up control processing procedures SRT3, and proceeds to the step SP4 of the above camera start-up control processing procedures RT1.

1-4. Operation and Advantage of Embodiment

With the above arrangement, the main control unit 12 of the digital still camera 1 determines whether or not the particular movement of this digital still camera 1 has been detected by the movement detecting unit 11 during a power-off state. As a result thereof, upon the particular movement of the digital still camera 1 having been detected by the movement detecting unit 11 before a power on command is input, the main control unit 12 starts the discriminant origin start-up control processing prior to input of the power on command thereof.

At this time, the main control unit 12 causes the saving control unit 8 to execute the saving start-up processing as the device start-up processing according to the first processing mode using the second operation clock. Also, the main control unit 12 sequentially causes the imaging control unit 5, display control unit 6, and developing control unit 7 to execute the imaging start-up processing, display start-up processing, and developing start-up processing as the device start-up processing according to the first processing mode using the second operation clock in parallel with the saving start-up processing thereof.

Subsequently, upon a power on command being input while executing the imaging start-up processing, display start-up processing, or developing start-up processing as the device start-up processing according to the first processing mode along with the saving start-up processing, the main control unit 12 starts the modification start-up control processing.

At this time, the main control unit 12 causes the saving control unit 8 to execute the rest of the saving start-up processing being executed as the device start-up processing according to the second processing mode using the first operation clock. Also, the main control unit 12 causes the imaging control unit 5, display control unit 6, and developing control unit 7 to execute the rest (i.e., the rest being executed, or before start) of the imaging start-up processing, display start-up processing, and developing start-up processing as the device start-up processing according to the second processing mode using the first operation clock in parallel with the saving start-up processing.

Subsequently, upon a subject being imaged for moving image shooting by the imaging processing block 20 after the end of the imaging start-up processing, and display of moving images of the subject on the display unit 12 being started by the display control unit 6 after the end of the display start-up processing, the main control unit 12 starts reception of input of an imaging command.

Accordingly, upon the particular movement of the digital still camera 1 being detected before input of a power on command, the main control unit 12 starts the device start-up processing, whereby In an actual arrangement time since a power on command was input until imaging of a subject can continuously be executed can extremely be shortened.

Also, when a power on command is input while executing the saving start-up processing, imaging start-up processing, display start-up processing, and developing start-up processing, the main control unit 12 executes control so as to execute the rest of the saving start-up processing, imaging start-up processing, display start-up processing, and developing start-up processing from the input point thereof in parallel, using the first operation clock.

Accordingly, when a power on command is input while executing the saving start-up processing, imaging start-up processing, display start-up processing, and developing start-up processing, the main control unit 12 can further shorten time from the input point thereof until imaging of a subject can continuously be executed.

According to the above arrangement, upon detecting the particular movement of the digital still camera 1 in a power off state before input of a power on command, the digital still camera 1 starts the discriminant origin start-up control processing to cause the imaging control unit 5, display control unit 6, developing control unit 7, and saving control unit 8 to execute the imaging start-up processing, display start-up processing, developing start-up processing, and saving start-up processing as the device start-up processing according to the first processing mode using the second operation clock, and upon a power on command being input during execution thereof, starts the modification start-up control processing to cause the imaging control unit 5, display control unit 6, developing control unit 7, and saving control unit 8 to execute the rest of the imaging start-up processing, display start-up processing, developing start-up processing, and saving start-up processing as the device start-up processing according to the second processing mode using the first operation clock, in parallel, and upon display of moving images of the subject on the display unit 21 being started, starts reception of input of an imaging command.

Thus, upon detecting the particular movement of the digital still camera 1 before input of a power on command, the digital still camera 1 starts the device start-up processing, whereby actually time since a power on command was input until imaging of a subject can continuously be executed can extremely be shortened. Thus, the digital still camera 1 can dramatically improve easy of use.

Also, upon detecting the particular movement of the digital still camera 1 before input of a power on command, the digital still camera 1 executes control so as to execute the imaging start-up processing, display start-up processing, developing start-up processing, and saving start-up processing as the device start-up processing according to the first processing mode using the second operation clock.

Accordingly, in the case of detecting the particular movement of the digital still camera 1 before input of a power on command, and executing the device start-up processing, the digital still camera 1 can reduce depletion in the remaining battery amount of the power source block BTB by reducing the consumption power.

At this time, in addition to this, the digital still camera 1 sequentially executes the imaging start-up processing, display start-up processing, and developing start-up processing as the device start-up processing according to the first processing mode.

Accordingly, the digital still camera 1 can prevent fast depletion of the power source block BTB by reducing parallel processing with the device start-up processing according to the first processing mode as much as possible.

Further, even when detecting the particular movement of the digital still camera 1, and executing the device start-up processing, upon no power on command being input, the digital still camera 1 stops the operations of the imaging control unit 5, display control unit 6, developing control unit 7, and saving control unit 8.

Accordingly, even when detecting movement different from photography shooting of a subject as the particular movement of the digital still camera 1, the digital still camera 1 can reduce wasteful decrease in the remaining battery amount of the power source block BTB.

Further, when a power on command is input without detecting the particular movement of the digital still camera 1, the digital still camera 1 executes control so as to execute the imaging start-up processing, display start-up processing, developing start-up processing, and saving start-up processing as the device start-up processing in parallel.

Accordingly, even when a power on command is input without detecting the particular movement thereof, the digital still camera 1 can shorten time from input of the power on command until imaging of a subject can continuously be executed as compared to existing digital still cameras.

Further, with the digital still camera 1, the movement detecting unit 11 to be used for shaking correction is also used for detection of the particular movement of this digital still camera 1. Thus, the digital still camera 1 can realize the above start-up control processing without complicating the configuration thereof.

2. Modifications

2-1. Modification 1

Note that, with above embodiment, description has been made regarding a case where, with the discriminant origin start-up control processing, and the input origin start-up control processing, when display of moving images on the display unit 21 is started, the main control unit 12 starts reception of input of an imaging command by the display control unit 6. However, the present invention is not restricted to this, and accordingly, with the discriminant origin start-up control processing, and the input origin start-up control processing, when the imaging start-up processing executed by the imaging control unit 5 ends, reception of input of an imaging command may be started.

However, as can be clearly seen from the above FIG. 2 through FIG. 6, the imaging control unit 5 may end the imaging start-up processing before the display control unit 6 starts display of moving images on the display unit 21.

Figure 12:
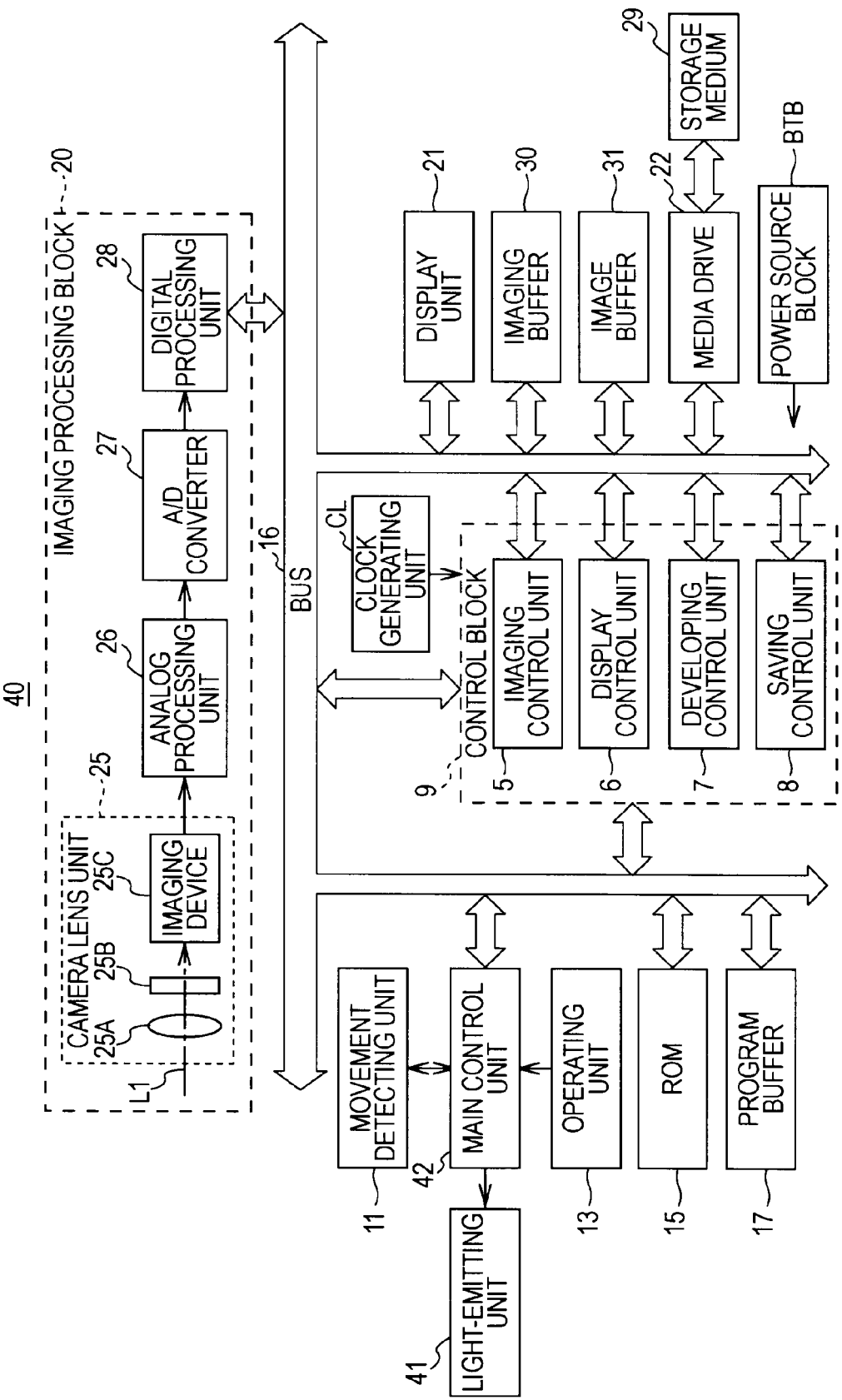
FIG. 12 is a block diagram illustrating a modification of the circuit configuration of the digital still camera.

Therefore, in the case of such an arrangement, such as shown in FIG. 12 wherein the portions corresponding to those in FIG. 1 are denoted with the same reference numerals, with the present invention, a light-emitting unit 41 is provided to a predetermined position of the armor case of a digital still camera 40.

Subsequently, upon the end of the imaging control processing executed by the imaging control unit 5 using the first operation clock being notified, a main control unit 42 of the digital still camera 40 starts reception of input of an imaging command to enable photograph shooting, and also turns on the light-emitting unit 41 with a predetermined emission color.

Thus, even before display start of moving images on the display unit 21 by the display control unit 6, the main control unit 42 can notify the user that photography shooting of a subject can be executed, according to emission of the light emitting unit 41.

Also, an arrangement may be made wherein when the end of the imaging control processing executed by the imaging control unit 5 using the second operation clock is notified, the main control unit 42 turns on the light emitting unit 41 with a predetermined emission color, and the end of the imaging start-up processing is notified by the emission thereof.

Subsequently, upon a power on command being input by the user who received the notice thereof, the main control unit 42 may start reception of input of an imaging command in response to this input to enable photography shooting.

That is to say, when a photograph opportunity is determined to have occurred, and photography shooting of a subject is desired as quick as possible by the user, the main control unit 42 enables photography shooting at earlier time than the case of the above embodiment, and can accurately notify this.

Also, when starting the discriminant origin start-up control processing, the main control unit 42 may not read out each boot program from the ROM 15 at the same time, but sequentially read out each of boot programs.

That is to say, the main control unit 42 may sequentially read out the corresponding boot program from the ROM 15 in accordance with start of the imaging start-up processing, display start-up processing, developing start-up processing, and saving start-up processing of the imaging control unit 5, display control unit 6, developing control unit 7, and saving control unit 8.

In the case of such an arrangement, when starting the discriminant origin start-up control processing, the main control unit 42 decreases the number of boot programs to be read out from the ROM 15, and can start the imaging start-up processing earlier accordingly.

Accordingly, in the case of such an arrangement, the main control unit 42 can start reception of input of an imaging command further earlier by shortening time from start of the discriminant origin start-up control processing until the end of the imaging start-up processing.

Further, with the present invention, an arrangement may be made wherein, with the digital still camera 1, instead of a boot program being stored in the ROM 15, a nonvolatile memory capable of high-speed access is provided, and the boot program is stored in the nonvolatile memory thereof beforehand. Note that examples of such nonvolatile memory include EEPROM (Electrically Erasable Programmable Read Only Memory), and MRAM (Magnetoresistive Random Access Memory) and so forth.

Thus, with the present invention, with the discriminant origin start-up control processing and the input origin start-up control processing, the imaging control unit 5, display control unit 6, developing control unit 7, and saving control unit 8 can execute the imaging start-up processing, display start-up processing, developing start-up processing, and saving start-up processing in accordance with the boot program within the nonvolatile memory.

Accordingly, with the present invention, in the case of such an arrangement, with the discriminant origin start-up control processing and the input origin start-up control processing, the boot program does not have to be read out from the ROM 15 to the program buffer 17, and accordingly, the processing can be simplified, and also the processing time can be shortened by that much.

That is to say, with the present invention, in the case of such an arrangement, time from start of the discriminant origin start-up control processing and the input origin start-up control processing until the end of the imaging start-up processing can be further shortened, and reception of input of an imaging command can be started markedly earlier.

Also, with the present invention, in the case of such an arrangement, nonvolatile memory is provided to the digital still camera 1 instead of the ROM 15 and the program buffer 17, whereby the configuration can also be simplified.

2-2. Modification 2

Further, with the above embodiment, a case has been described wherein upon starting the discriminant origin start-up control processing, the imaging start-up processing and the saving start-up processing are started generally at the same time as the device start-up processing according to the first processing mode, and the display start-up processing and the developing start-up processing are sequentially executed. However, the present invention is not restricted to this, an arrangement may be made wherein upon starting the discriminant origin start-up control processing, the imaging start-up processing, display start-up processing, developing start-up processing, and saving start-up processing are sequentially executed in various orders using the first or second operation clock serving as the first processing mode.

Also, with the present invention, upon a power on command being input while sequentially executing the imaging start-up processing, display start-up processing, developing start-up processing, and saving start-up processing using the second operation clock serving as the first processing mode, the rest of the processing may be executed in parallel using the second operation clock serving as the second processing mode.

Further, with the present invention, upon a power on command being input while sequentially executing the imaging start-up processing, display start-up processing, developing start-up processing, and saving start-up processing using the second operation clock serving as the first processing mode, the rest of the processing may sequentially be executed using the first operation clock serving as the second processing mode.

Further, with the present invention, upon a power on command being input while sequentially executing the imaging start-up processing, display start-up processing, developing start-up processing, and saving start-up processing using the first operation clock serving as the first processing mode, the rest of the processing may be executed in parallel using the first operation clock serving as the second processing mode.

Further, with the present invention, upon a power on command being input while sequentially executing the imaging start-up processing, and the like using the first or second operation clock serving as the first processing mode, the rest of the processing may be executed in parallel or in series using a faster operation clock than the first operation clock serving as the second processing mode.

Further, with the present invention, upon a power on command being input while sequentially executing the imaging start-up processing, display start-up processing, developing start-up processing, and saving start-up processing using the first operation clock, the rest of the processing may be executed sequentially without change, using the first operation clock. With the present invention, according to such various arrangements, the same advantages as in the case of the above embodiment can be obtained.

2-3. Modification 3

Further, with the above embodiment, a case has been described wherein, with the discriminant origin start-up control processing, after a power on command is input, an imaging command is input. However, the present invention is not restricted to this, and rather, with the discriminant origin start-up control processing, when a power on command is input, in the event that at least the imaging start-up processing has ended, a subject may automatically be imaged for photography shooting according to the input thereof.

Also, with the present invention, with the discriminant origin start-up control processing, when a power on command is input, in the event that at least the imaging start-up processing has not ended, at the time of the imaging start-up processing ending, a subject may automatically be imaged for photography shooting.

2-4. Modification 4

Further, with the above embodiment, a case has been described wherein upon a power on command being input during the discriminant origin start-up control processing, the imaging start-up processing, display start-up processing, developing start-up processing, and saving start-up processing, which are being executed using the second operation clock, are executed from the middle thereof using the first operation clock.

However, the present invention is not restricted to this, and rather, upon a power on command being input during the discriminant origin start-up control processing, the imaging start-up processing, display start-up processing, developing start-up processing, and saving start-up processing, which are being executed using the second operation clock, may be executed from the beginning thereof again using the first operation clock.

Also, the main control unit 12 stores the processing time in the case of executing each of the imaging start-up processing, display start-up processing, developing start-up processing, and saving start-up processing using the first operation clock or second operation clock beforehand, for example.

Further, with the discriminant origin start-up control processing, whenever starting the imaging start-up processing, display start-up processing, developing start-up processing, and saving start-up processing, the main control unit 12 starts counting of the processing time. Subsequently, upon a power on command being input during the discriminant origin start-up control processing, the main control unit 12 selects a processing method that can end the imaging start-up processing, display start-up processing, developing start-up processing, and saving start-up processing, which are being executed, earliest, based on the counted processing time and stored processing time.

That is to say, the main control unit 12 selects whether to execute the imaging start-up processing, display start-up processing, developing start-up processing, and saving start-up processing, which are being executed using the second operation clock, from the middle thereof using the first operation clock, or whether to execute these from the beginning thereof using the first operation clock again. Subsequently, the main control unit 12 may end the imaging start-up processing, display start-up processing, developing start-up processing, and saving start-up processing, which are being executed at the time of input of a power on command, earliest in accordance with the selection result thereof.

2-5. Modification 5

Further, with the above embodiment, a case has been described wherein the developing control unit 7 and the saving control unit 8 are provided to the digital still camera 1. However, the present invention is not restricted to this, and rather, a single storage control unit having both functions of the developing control unit 7 and the saving control unit 8 may be provided to the digital still camera 1.

With the present invention, an arrangement may be made wherein at the time of the imaging mode the storage control unit sequentially subjects imaging data for photographs to developing processing and saving processing to generate saving photograph image data and store this in the storage medium 29 which is an external medium.

In addition to this, with the present invention, a single storage control unit may be provided to the digital still camera instead of the developing control unit 7 and the saving control unit 8.

Subsequently, with the present invention, an arrangement may be made wherein at the time of the imaging mode, the storage control unit subjects imaging data for photographs to developing processing to generate compressed photograph image data, and stores this generated compressed photograph image data in the storage medium 29 which is an external medium.

Also, with the present invention, an arrangement may be made wherein at the time of the imaging mode, the storage control unit stores imaging data for photographs as is in the storage medium 29 which is an external medium, and at the time of the display mode, subjects the imaging data for photographs thereof to developing processing.

With the present invention, in the case of such various arrangements, with any arrangement as well, the configuration of the digital still camera 1 can be simplified, and also with the discriminant origin start-up control processing and the input origin start-up control processing, the processing time can be shortened by decreasing the number of control units for executing control unit start-up processing.

2-6. Modification 6

Further, with the above embodiment, a case has been described wherein the display control unit 6 and the display unit 21 are provided to the digital still camera 1. However, the present invention is not restricted to this, and rather, a viewfinder (peep window) may be provided to the digital still camera 1 in addition to or instead of the display control unit 6 and the display unit 21.

2-7. Modification 7

Further, with the above embodiment, a case has been described wherein the input origin start-up control processing is started according to input of a power on command in a power-off state, and with the discriminant origin start-up control processing, the processing content is modified. However, the present invention is not restricted to this, and rather, an arrangement may be made wherein when various types of operation key is operated in a power-off state, this is regarded as request for execution of the device start-up processing to start the input origin start-up control processing, or with the discriminant origin start-up control processing, the processing content is modified.

2-8. Modification 8

Further, with the above embodiment, a case has been described wherein imaging data for photographs is temporarily stored in the imaging buffer 30 made up of volatile memory, and compressed photograph image data is temporarily stored in the image buffer 31 made up of volatile memory.

However, the present invention is not restricted to this, and rather, an arrangement may be made wherein imaging data for photographs is temporarily stored in nonvolatile memory such as EEPROM or MRAM, and compressed photograph image data is temporarily stored in nonvolatile memory such as EEPROM or MRAM.

2-9. Modification 9

Further, with the above embodiment, a case has been described wherein the imaging apparatus according to the present invention has been applied to the digital still cameras 1 and 40 described above regarding FIG. 1 through FIG. 12. However, the present invention is not restricted to this, and rather, the present invention may be applied to an information processing device such as a personal computer, cellular phone, PDA (Personal Digital Assistance), portable game machine, or the like, which has an imaging function for photographs or for moving images. Also, additionally, the present invention may be applied to an imaging apparatus having various types of configuration such as a digital video camera, portable player, and the like, which has an imaging function for photographs or for moving images.

Further, with the present invention, the imaging control method according to the present invention may be applied to not only the device start-up processing in the imaging mode for imaging a subject for photography shooting as described above, but also the device start-up processing in the imaging mode for imaging a subject for recording (for moving image shooting for storing moving images).

2-10. Modification 10

Further, with the above embodiment, the imaging control program according to the present invention has been applied to the main control program held beforehand in the main control units 12 and 42 described above regarding FIG. 1 through FIG. 12. Subsequently, a case has been described wherein the main control units 12 and 42 execute the camera start-up control processing procedures RT1 described above regarding FIG. 7 in accordance with the main control program thereof.

However, the present invention is not restricted to this, and rather, the digital still cameras 1 and 40 may install the main control program using a computer-readable recording medium in which the main control program is recorded. Subsequently, the main control units 12 and 42 may execute the camera start-up control processing procedures RT1 described above regarding FIG. 7 in accordance with the installed main control program thereof.

Also, the digital still cameras 1 and 40 may externally install the main control program using a cable and wireless communication medium such as a local area network, the Internet, a digital satellite broadcasting, or the like.

The computer-readable recording medium for installing the main control program in the digital still cameras 1 and 40 to proceed to an executable state may be realized with a package medium such as a flexible disk, for example.

Also, the computer-readable recording medium for installing the main control program in the digital still cameras 1 and 40 to proceed to an executable state may be realized with a packaged medium such as a CD-ROM (Compact Disc-Read Only Memory), for example.

Further, the computer-readable recording medium for installing the main control program in the digital still cameras 1 and 40 to proceed to an executable state may be realized with a packaged medium such as a DVD (Digital Versatile Disc), or the like.

Further, such a computer-readable recording medium may be realized with not only a package medium but also semiconductor memory, magnetic disk, or the like where various programs are temporarily or eternally recorded.

Also, a cable and wireless communication medium such as a local area network, the Internet, digital satellite broadcasting, or the like may be used as means for recording the main control program in these computer-readable recording media.

Further, as means for recording the main control program in a computer-readable recording medium, the main control program may be recorded via various types of communication interface such as a router, modem, or the like.

2-11. Modification 11

Further, with the above embodiment, a case has been described wherein the imaging control unit 5, display control unit 6, developing control unit 7, and saving control unit 8 described above regarding FIG. 1 through FIG. 12 are applied as multiple control units for controlling an imaging function. However, the present invention is not restricted to this, and rather, two control units of a storage control unit having both functions of the developing control unit 7 and the saving control unit 8, and the imaging control unit 5, or three control units of this storage control unit, imaging control unit 5, and display control unit 6 may be applied to the control units.

Also, with the present invention, two control units of the imaging control unit, and a control unit for storing and saving the saving photograph image data or compressed photograph image data or the like to a storage device on the network, may be applied to the control units. Further, with the present invention, additionally, various types of control unit such as a control unit made up of a microprocessor or DSP (Digital Signal Processor), or the like may be applicable.

2-12. Modification 12

Further, with the above embodiment, a case has been described wherein the power key described above regarding FIG. 1 through FIG. 12 is applied as a requesting unit for requesting execution of the start-up processing of multiple control units. However, the present invention is not restricted to this, and rather, a wide variety of requesting units having various types of configurations other than that may be applicable, such as an operation key other than the power key, like the release key.

2-13. Modification 13

Further, with the above embodiment, a case has been described wherein the detecting unit 11 including the acceleration sensor and the angular velocity sensor described above regarding FIG. 1 through FIG. 12 is applied as a detecting unit for detecting movement to be applied to the device main unit. However, the present invention is not restricted to this, and rather, a wide variety of detecting units having various types of configurations other than that may be applicable, such as a detecting unit including the acceleration sensor alone or the angular velocity sensor alone, or the like.

2-14. Modification 14

Further, with the above embodiment, a case has been described wherein the main control unit 12 made up of a CPU described above regarding FIG. 1 through FIG. 12 is applied as a start-up control unit which starts the start-up processing, upon the detecting unit detecting the particular movement in a power-off state in which the operation of the device main unit externally appears to be stopped, by starting the operation of each of the multiple control units still in a power-off state, and upon execution of the start-up processing being requested from the requesting unit, starts reception of an imaging command according to the execution state of the start-up processing of the multiple control units.

However, the present invention is not restricted to this, and rather, a wide variety of types of start-up control units may be applicable, such as one of a main control unit made up of a microprocessor or DSP, imaging control unit, display control unit, developing control unit, and saving control unit, and the like.

2-15. Modification 15

Further, with the above embodiment, a case has been described wherein the imaging processing block 20 described above regarding FIG. 1 through FIG. 12 is applied as an imaging processing unit for imaging a subject and outputting imaging data.

However, the present invention is not restricted to this, and rather, may be applied to an imaging processing block for imaging a subject for moving image shooting for recording to sequentially generate temporally consecutive imaging data. Also, the present invention may be applied to an imaging processing unit having various types of configuration other than that, such as an imaging processing unit to which an electric shutter function is provided instead of a shutter serving as a machine component, capable of imaging a subject for photography shooting.

2-16. Modification 16

Further, with the above embodiment, a case has been described wherein the imaging control unit 5 made up of a CPU described above regarding FIG. 1 through FIG. 12 is applied as an imaging control unit for controlling the imaging processing unit. However, the present invention is not restricted to this, and rather, a wide variety of imaging control units having various types of configurations other than that, such as an imaging control unit, made up of a microprocessor, DSP, or the like, may be applicable.

2-17. Modification 17

Further, with the above embodiment, a case has been described wherein the developing control unit 7 made up of a CPU, and the saving control unit 8 made up of a CPU, described above regarding FIG. 1 through FIG. 12 are applied as a storage control unit for storing imaging data in a storage medium to be detachably mounted to the device main unit.

However, the present invention is not restricted to this, and rather, a storage control unit made up of a microprocessor or DSP may be applicable. Also, with the present invention, a wide variety of storage control units having various types of configurations other than that, such as an imaging control unit for performing developing processing of imaging data and storing obtained compressed photograph image data in the storage medium, a control unit for storing imaging data as is in a storage medium, or the like, may be applicable.

2-18. Modification 18

Further, with the above embodiment, a case has been described wherein the storage medium 29 made up of nonvolatile memory that is an external medium described above regarding FIG. 1 through FIG. 12 is applied as a storage medium to be detachably mounted to the device main unit. However, the present invention is not restricted to this, and rather, a wide variety of types of storage mediums other than that may be applicable, such as an optical disc, magnetic disk, or the like.

2-19. Modification 19

Further, with the above embodiment, a case has been described wherein the display control unit 6 made up of a CPU described above regarding FIG. 1 through FIG. 12 is applied as a display control unit and a display unit for displaying an image on the display unit based on imaging data. However, the present invention is not restricted to this, and rather, a wide variety of display control units having various types of configurations may be applicable, such as a display control unit made up of a microprocessor or DSP, or the like.

The present application contains subject matter related to that disclosed in Japanese Priority Patent Application JP 2009-104357 filed in the Japan Patent Office on Apr. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an image processing unit configured to image a subject to output imaging data;
    a display unit;
    a plurality of control units configured to control an imaging function, wherein said plurality of control units include an imaging control unit configured to control said image processing unit, a storage control unit configured to store said imaging data in a storage medium to be detachably mounted to a device main unit, and a display control unit configured to cause said display unit to display an image based on said imaging data;
    a requesting unit configured to request execution of start-up processing of a plurality of said control units;
    a detecting unit configured to detect movement to be applied to said device main unit; and
    a start-up control unit configured to cause, upon said detecting unit detecting particular movement in a power-off state wherein the operation of said device main unit externally appears to be stopped, each of a plurality of said control units to start said start-up processing with a predetermined operation clock as a first processing mode for causing each of a plurality of said control units to start operation still in said power-off state, and upon execution of said start-up processing being requested from said requesting unit before all pieces of said start-up processing are completed, cause a plurality of said control units to execute the rest of said start-up processing with a high-speed operation clock that is higher than said predetermined operation clock as said second processing mode, and cause a plurality of said control units to start reception of an imaging command according to the states of said start-up processing of a plurality of said control units, wherein
    said start-up control unit causes said imaging control unit, said storage control unit and said display control unit to start said start-up processing with said predetermined operation clock as a first processing mode for causing each of said storage control unit and said display control unit to start operation, and upon execution of said start-up processing being requested from said requesting unit after completion of said start-up processing by said display control unit, causes said display control unit to light said display unit.

2. The imaging apparatus according to claim 1, wherein said start-up control unit causes a plurality of said control units to execute the rest of said start-up processing in parallel with said high-speed operation clock as said second processing mode.

3. The imaging apparatus according to claim 2, wherein upon execution of said start-up processing not being requested from said requesting unit even in the event of exceeding a predetermined waiting time since all pieces of said start-up processing of a plurality of said control units were completed, said start-up control unit causes a plurality of said control units to stop the operation of each of a plurality of said control units.

4. The imaging apparatus according to claim 1, wherein said start-up control unit causes said imaging control unit said storage control unit and said display control unit to start said start-up processing with said predetermined operation clock as said first processing mode for causing each of said storage control unit and said display control unit to start operation, and upon execution of said start-up processing being requested from said requesting unit after completion of said start-up processing by said imaging control unit, causes said imaging control unit to control said imaging processing unit to image said subject.

5. The imaging apparatus according to claim 4, further comprising:
 a light emitting unit;
 wherein said start-up control unit causes said light emitting unit to emit light when said start-up processing of said imaging control unit is completed.

6. The imaging apparatus according to claim 5, wherein upon execution of said start-up processing being requested from said requesting unit before said detecting unit detects said particular movement in said power-off state, said start-up control unit causes said imaging control unit, said storage control unit, and said display control unit to start said start-up processing simultaneously.

* * * * *